(12) United States Patent
Hwang et al.

(10) Patent No.: US 7,257,163 B2
(45) Date of Patent: *Aug. 14, 2007

(54) METHOD AND SYSTEM FOR REDUCING INTER-SYMBOL INTERFERENCE EFFECTS IN TRANSMISSION OVER A SERIAL LINK WITH MAPPING OF EACH WORD IN A CLUSTER OF RECEIVED WORDS TO A SINGLE TRANSMITTED WORD

(75) Inventors: Seung Ho Hwang, Palo Alto, CA (US); Jano Banks, Cupertino, CA (US); Paul Daniel Wolf, San Carlos, CA (US); Eric Lee, San Jose, CA (US); William Sheet, Fremont, CA (US); Albert M. Scalise, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 946 days.

This patent is subject to a terminal disclaimer.

(21) Appl. No.: 10/095,422

(22) Filed: Mar. 12, 2002

(65) Prior Publication Data

US 2003/0048852 A1    Mar. 13, 2003

Related U.S. Application Data

(63) Continuation-in-part of application No. 10/036,234, filed on Dec. 24, 2001, and a continuation-in-part of application No. 09/954,663, filed on Sep. 12, 2001.

(51) Int. Cl.
H04B 14/04    (2006.01)
(52) U.S. Cl. .................. 375/242; 375/346; 348/473; 348/476
(58) Field of Classification Search ............. 375/244, 375/285, 296, 219, 340, 346, 240.26; 348/473, 348/476

See application file for complete search history.

(56) References Cited

U.S. PATENT DOCUMENTS

| 5,150,211 | A | | 9/1992 | Charbonnel et al. | ......... 358/143 |
| 5,199,030 | A | | 3/1993 | Ueda | ........................... 370/68 |
| 5,349,350 | A | * | 9/1994 | Blagaila | ...................... 341/59 |
| 5,506,932 | A | | 4/1996 | Holmes et al. | ............. 395/2.14 |
| 5,523,795 | A | | 6/1996 | Ueda | ........................... 348/480 |

(Continued)

FOREIGN PATENT DOCUMENTS

WO    WO 00/16525    3/2000

OTHER PUBLICATIONS

*High-Bandwidth Digital Content Protection System*, Revision 1.0, by Intel Corporation, Feb. 17, 2000, pp. 1-60.

(Continued)

*Primary Examiner*—Temesghen Ghebretinsae
(74) *Attorney, Agent, or Firm*—Girard & Equitz LLP

(57) ABSTRACT

A system in which encoded data (e.g., encoded video and auxiliary data) are transmitted over a serial link. Other aspects of the invention are transmitters for use in encoding data for transmission over a serial link, receivers for receiving such data, and methods for sending encoded data over a serial link. Source data to be transmitted are encoded using a subset of a full set of code words. The subset consists of preferred code words. Disjoint clusters of code words in the full set are predetermined. Each cluster includes one or more of the preferred words, and optionally also at least one additional code word that is similar to a preferred word of the cluster in the sense that it is likely to be generated as a result of probable bit errors in transmission, or transmission and decoding, of such preferred word. Each preferred word of a cluster is indicative of a single source data value. Each received code word in a cluster is mapped to the source data value determined by each preferred word of the cluster.

75 Claims, 8 Drawing Sheets

U.S. PATENT DOCUMENTS

| | | | |
|---|---|---|---|
| 5,541,662 A | 7/1996 | Adams et al. | 348/460 |
| 5,905,769 A | 5/1999 | Lee et al. | 375/376 |
| 5,940,070 A | 8/1999 | Koo | 345/302 |
| 5,974,464 A | 10/1999 | Shin et al. | 709/231 |
| 6,141,691 A | 10/2000 | Frink et al. | 709/233 |
| 6,185,250 B1 | 2/2001 | Wang et al. | 66/62 |
| 6,191,822 B1 | 2/2001 | Smyers | 348/552 |
| 6,208,715 B1 | 3/2001 | Haavisto | 379/88.07 |
| 6,241,778 B1 | 6/2001 | de Lind van Wijngaarden et al. | 341/58 |
| 6,249,669 B1 | 6/2001 | Ogino et al. | 455/63 |
| 6,914,637 B1 * | 7/2005 | Wolf et al. | 348/473 |

OTHER PUBLICATIONS

*High-Bandwith Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan. 26, 2001, pp. 1-38.

Lieberman, David "PC Video Interface Looks to Add Audio Capability", *EE Times* (Mar. 26, 2001, 11:57 a.m. EST), pp. 1-3, downloaded from the Internet on May 23, 2001 from http://www.eetimes.com/story/OEG20010326S0029.

Silicon Image, Inc., "*Silicon Image First to Couple Digital Audio and Video on the DVI Link*", Sunnyvale, Jan. 16, 2001, pp. 1-4, downloaded from the Internet on May 22, 2001 from http://www.siimage.com/press/01_16_01.asp.

Silicon Image, Inc., "*CE Industry Heavyweights Proclaim DVI HDCP as the Interface for HDTV-Further Propelling Silicon Image into the CE Space*", Las Vegas, Jan. 4, 2001, pp. 1-4, downloaded from the Internet on May 22, 2001 from http://www.siimage.com/press/01_04_01a.asp.

Goldie, John, "*LVDS based FPD-Link spans industries with Gigabits @ milliwatts!*", National Semiconductor Corporation, Online!, May 1, 2001, pp. 1 to 6, from http://www.national.com/nationaledge/May01/lvds.html.

Siegel, P.H., "*Recording Codes For Digital Magnetic Storage*", IEEE Transactions On Magnetics, MAG-21, No. 5, Sep. 1985, pp. 1344-1349.

* cited by examiner

| Specific CTL | CTL [1:0] | Preamble (q0:q9) | Guardband (q0:q9) | GB (d7:d0) | Purpose |
|---|---|---|---|---|---|
| R (CTL [3:2]) | 00 | 0010101011 | 0011001101 | 0xAB | Video Preamble/Video Guardband/Post-Data Aux Guardband |
| G (CTL [1:0]) | 00 | 0010101011 | 0011001101 | 0xAB | Video Preamble/Video Guardband/Post-Data Aux Guardband |
| B (VSYNC:HSYNC) | XX | 1 of 4 values | 0011001101 | 0xAB | Video Preamble/Video Guardband |
| R (CTL [3:2]) | 01 | 1101010100 | 1100110010 | 0x55 | Aux Preamble/Pre-Data Aux Guardband |
| G (CTL [1:0]) | 10 | 0010101010 | 1100110010 | 0x55 | Aux Preamble/Pre-Data Aux Guardband |
| B (VSYNC:HSYNC) | XX | 1 of 4 values | 1 of 4 values | 0x5B, 0xB5, 0xD3, 0xD9 | Aux Preamble/Pre- or Post-Data Aux Guardband |
| R (CTL [3:2]) | 10 | 0010101010 | | | VSync Window, HDCP enabled |
| G (CTL [1:0]) | 00 | 0010101011 | | | VSync Window, HDCP enabled |
| B (VSYNC:HSYNC) | XX | 1 of 4 values | | | VSync Window, HDCP enabled |

FIG. 3

17 Ordered Codes

| | Input D7–D0 | Hex | TMDS pattern | TMDS result | Rx Decode | Hex | Highly Probable |
|---|---|---|---|---|---|---|---|
| PRE-DATA GUARD BAND for Aux data | 01010101 | 55 | 1100110010 | 1110110010 | 01011001 | 59 | |
| | | | | 1100010010 | 01100101 | 65 | |
| | | | | 1100111010 | 10010101 | 95 | IGNORE |
| | | | | 1100110000 | 10101011 | AB | IGNORE |
| AD0 | 01011011 | 5B | 0011100101 | 1011100101 | 01011000 | 58 | |
| | | | | 0001100101 | 01010111 | 57 | |
| | | | | 0011110101 | 00111011 | 3B | |
| | | | | 0011100001 | 11011011 | DB | |
| AD1 | 10110101 | B5 | 0110001101 | 1110001101 | 10110110 | B6 | IGNORE |
| | | | | 0111001101 | 10101101 | AD | |
| | | | | 0110000101 | 01110101 | 75 | |
| | | | | 0110001111 | 01001011 | 4B | IGNORE |
| AD2 | 11010011 | D3 | 0010011101 | 1010011101 | 11010000 | D0 | |
| | | | | 0000011101 | 11011111 | DF | |
| | | | | 0010001101 | 10110011 | B3 | |
| | | | | 0010011111 | 00101101 | 2D | |
| AD3 | 11011001 | D9 | 0100011101 | 1100011101 | 11011010 | DA | IGNORE |
| | | | | 0100001101 | 10111001 | B9 | |
| | | | | 0100011111 | 00100111 | 27 | |
| AD4 | 01101101 | 6D | 0111000101 | 1111000101 | 01101110 | 6E | |
| | | | | 0111100101 | 01011101 | 5D | |
| | | | | 0111000001 | 11101101 | ED | |
| | | | | 1111100101 | 01011110 | 5E | |
| AD5 | 10100100 | A4 | 0011100110 | 1011100110 | 10100111 | A7 | IGNORE |
| | | | | 0001100110 | 10101000 | A8 | |
| | | | | 0011110110 | 11000100 | C4 | |
| | | | | 0011100010 | 00100100 | 24 | |
| | | | | 0011100111 | 10100101 | C5 | IGNORE |

FIG. 4A

| | | | | | | |
|---|---|---|---|---|---|---|
| AD6 | 10010010 | 92 | 0111000110 | 1111000110 | 10010001 | 91 | |
| | | | | 0111100110 | 10100010 | A2 | |
| | | | | 0111000010 | 00010010 | 12 | |
| | | | | 0111000111 | 10010011 | 93 | IGNORE |
| AD7 | 01000100 | 44 | 0011110010 | 1011110010 | 01000111 | 47 | |
| | | | | 0001110010 | 01001000 | 48 | |
| | | | | 0011111010 | 10000100 | 84 | |
| | | | | 0011110000 | 10111010 | BA | IGNORE |
| AD8 | 00100010 | 22 | 0111100010 | 1111100010 | 00100001 | 21 | |
| | | | | 0111110010 | 01000010 | 42 | |
| | | | | 0111100000 | 11011100 | DC | |
| | | | | 0111110000 | 10111100 | BC | |
| AD9 | 01001011 | 4B | 1001110010 | 1101110010 | 01001101 | 4D | |
| | | | | 1000110010 | 01010011 | 53 | |
| | | | | 1001111010 | 10001011 | 8B | |
| | | | | 1001110000 | 10110101 | B5 | IGNORE |
| AD10 | 10010011 | 93 | 1000111010 | 1100111010 | 10010101 | 95 | |
| | | | | 1000011010 | 10100011 | A3 | |
| | | | | 1000111110 | 00010011 | 13 | |
| GUARD BAND for video data and POST-DATA GUARD BAND for Aux Data (and AD11) | 10101011 | AB | 0011001101 | 1011001101 | 10101000 | A8 | IGNORE |
| | | | | 0001001101 | 10100111 | A7 | |
| | | | | 0011101101 | 10011011 | 9B | |
| | | | | 0011000101 | 01101011 | 6B | |
| | | | | 0011001111 | 01010101 | 55 | IGNORE |
| AD12 | 01011010 | 5A | 1100011001 | 1110011001 | 01010110 | 56 | |
| | | | | 1100001001 | 00111010 | 3A | |
| | | | | 1100011101 | 11011010 | DA | IGNORE |
| | | | | 1100011000 | 01011011 | 5B | IGNORE |
| AD13 | 01101100 | 6C | 1000111001 | 1100111001 | 01101010 | 6A | |
| | | | | 1000011001 | 01011100 | 5C | |
| | | | | 1000111101 | 11101100 | EC | |
| | | | | 1000111000 | 01101101 | 6D | IGNORE |
| AD14 | 10100101 | A5 | 1100011010 | 1110011010 | 10101001 | A9 | |
| | | | | 1100001010 | 11000101 | C5 | |
| | | | | 1100011110 | 00100101 | 25 | |
| AD15 | 10111010 | BA | 1100001101 | 1110001101 | 10110110 | B6 | |
| | | | | 1100000101 | 01111010 | 7A | |

FIG. 4B

METHOD AND SYSTEM FOR REDUCING INTER-SYMBOL INTERFERENCE EFFECTS IN TRANSMISSION OVER A SERIAL LINK WITH MAPPING OF EACH WORD IN A CLUSTER OF RECEIVED WORDS TO A SINGLE TRANSMITTED WORD

CROSS-REFERENCE TO RELATED APPLICATION

This application is a continuation-in-part of pending U.S. patent application Ser. No. 09/954,663, filed on Sep. 12, 2001, and assigned to the assignee of the present application, and a continuation-in-part of pending U.S. patent application Ser. No. 10/036,234, filed on Dec. 24, 2001, and assigned to the assignee of the present application.

TECHNICAL FIELD OF THE INVENTION

The invention pertains to transmission of encoded data (e.g., one or both of video data and auxiliary data such as audio data) over a serial link, in such a manner as to reduce the bit error rate resulting from inter-symbol interference or other error-causing effects during transmission. In some embodiments, the serial link is a transition minimized differential signaling ("TMDS") link, or a link having some but not all of the characteristics of a TMDS link.

BACKGROUND OF THE INVENTION

Elements of this invention are based upon properties of a serial link. Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
    a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
    b. the encoding of video data is performed such that the in-band words are transition minimized (a sequence of in-band words has a reduced or minimized number of transitions);
    c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

It has been proposed to encrypt video data transmitted over a serial link. For example, it has been proposed to use a cryptographic protocol known as "High-bandwidth Digital Content Protection" ("HDCP") to encrypt digital video to be transmitted over a DVI link and to decrypt the data at the DVI receiver. A DVI transmitter implementing HDCP outputs a 24-bit bus, known as cout[23:0], during the video active period (i.e. when DE is high). This 24-bit cout data is "Exclusive Ored" (in logic circuitry in the transmitter) with the 24-bit RGB video data input to the transmitter in order to encrypt the video data. The encrypted data is then encoded (according to the TMDS standard) for transmission. The same cout data is also generated in the receiver. After the encoded and encrypted data received at the receiver undergoes TMDS decoding, the cout data is processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). After the receiver has been authenticated, the transmitter calculates the initial set of encryption keys (for encrypting the first line of input video data) in response to a control signal and sends the control signal to the receiver (during each vertical blanking period, when DE is low) to cause the receiver to calculate an initial set of decryption keys (for decrypting the first received and decoded line of transmitted video data). Following generation of the initial set of encryption/decryption keys, each of the transmitter and receiver performs a re-keying operation during each blanking (vertical or horizontal) interval to generate a new set of keys for encrypting (or decrypting) the next line of video data, and actual encryption of input video data (or decryption of received, decoded video data) is performed using the latest set of keys only when DE is high (not during the blanking intervals).

Each of the transmitter and receiver includes an HDCP cipher circuit (sometimes referred to herein as an "HDCP cipher") including a linear feedback shift register (LFSR) module, a block module coupled to the output of the LFSR module, and an output module coupled to an output of the block module. The LFSR module is employed to re-key the block module in response to each assertion of an enable signal, using a session key (Ks) and frame key (Ki). The block module generates (and provides to the LFSR module) the key Ks at the start of a session and generates (and applies to the LFMS module) a new value of key Ki at the start of each frame of video data (in response to a rising edge of a control signal which occurs in the first vertical blanking interval of a frame).

The block module comprises two halves, known as "Round Function K" and "Round Function B." Round Function K includes 28-bit registers Kx, Ky, and Kz, seven S-Boxes (each a 4 input bit by 4 output bit S-Box including a look-up table), and a linear transformation unit K. Round Function B includes 28-bit registers Bx, By, and Bz, seven S-Boxes (each a 4 input bit by 4 output bit S-Box including a look-up table), and a linear transformation unit B. Round Function K and Round Function B are similar in design, but Round Function K performs one round of a block cipher per clock cycle (to the output module) a different pair of 28-bit round keys (Ky and Kz) each clock cycle in response to the output of the LFSR module, and Round Function B performs one round of a block cipher per clock cycle, in response to each 28-bit round key Ky from Round Function K and the output of the LFSR module, to assert (to the output module) a different pair of 28-bit round keys (By and Bz) each clock cycle. The transmitter generates value An at the start of the authentication protocol and the receiver responds to it during the authentication procedure. The value An is used to randomize the session key. The block module operates in response to the authentication value (An) and an initialization value (Mi, also referred to as an integrity verification key) which is updated by the output module at the start of each frame.

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

The output module performs a compression operation on the 28-bit keys (By, Bz, Ky and Kz) asserted to it (a total of 112 bits) by the block module during each clock cycle, to generate one 24-bit block of pseudo-random bits cout[23:0] per clock cycle. Each of the 24 output bits of the output module consists of the exclusive OR ("XOR") of nine terms.

In the transmitter, logic circuitry receives each 24-bit block of cout data and each input 24-bit RGB video data word, and performs a bitwise XOR operation thereon in order to encrypt the video data, thereby generating a word of encrypted RGB video data. Typically, the encrypted data subsequently undergoes TMDS encoding before it is transmitted to a receiver. In the receiver, logic circuitry receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will sometimes be used to denote a serial link capable of transmitting encoded data (e.g., encoded digital video data) and a clock for the encoded data, from a transmitter to a receiver, and optionally also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. There are several conventional TMDS-like links.

Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Also, although a TMDS link has four differential pairs (in the single pixel version), three for video data and the other for a video clock, a TMDS-like link could have a different number of conductors or conductor pairs.

Typically, the primary data transmitted by a TMDS link are video data. What is often significant about this is that the video data are not continuous, and instead have blanking intervals. These blanking intervals provide an opportunity (exploited in some embodiments of the present invention) for auxiliary data to be transported, and they represent unused bandwidth. However, many serial links do not transmit data having blanking intervals, and thus do not encode input data (for transmission) in response to a data enable signal. For example, audio serial links would typically transmit continuous data.

The expression "auxiliary data" is used in a broad sense herein to denote digital audio data or any other type of data other than video data and timing information for video data (e.g., a video clock). For example, timing information for audio data (e.g., a clock for recovering transmitted audio data) falls within the scope of "auxiliary data." Other examples of "auxiliary data" transmitted in accordance with the invention include computer keyboard signals, still image data (generated by a camera, for example), text data, control signals for a power supply, picture in picture data, monitor control information (audio volume, brightness, power state), control signals for indicator lights on a monitor or keyboard, non-audio or video control information, etc.

The term "stream" of data, as used herein, denotes that all the data are of the same type and is transmitted with the same clock frequency. The term "channel," as used herein, refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link. Because it is desirable to transmit many different streams of auxiliary data in important applications of the invention, preferred embodiments of the invention provide multiple channels for transmission of auxiliary data, including channels for transmission of auxiliary data in both directions over the link (that is, with and against the direction of the video data). In some implementations, a channel is employed to transmit one stream of auxiliary data. In other implementations, a channel is employed to transmit more than one stream of auxiliary data. In some embodiments of the invention, two (or more than two) streams of serial video data are transmitted (over one, two, or more than two channels), and either one, two, or more than two streams of serial auxiliary data are also transmitted.

U.S. Pat. No. 5,999,571, issued Dec. 7, 1999, teaches (e.g., at col. 5) that, when the code words (indicative of video data) transmitted over a TMDS link are transition minimized words (a first subset of a set of code words), synchronization words (distinguishable from the transition minimized code words) can be transmitted over the link during "preamble" periods in which encoded video data are not transmitted. The synchronization words can be transition maximized words that are members of a second subset (disjoint from the first subset) of the set of code words. U.S. Pat. No. 5,999,571 teaches that several (e.g., three) repetitions of a synchronization word should be transmitted consecutively, to allow the decoder (in the receiver) rapidly and accurately to identify a specific transition (e.g., the leading edge) of one of the synchronization words and thus to accomplish synchronization with the encoder (in the transmitter.

U.S. Pat. No. 6,151,334, issued Nov. 21, 2000, teaches transmission (over a TMDS link) of several different types of encoded control words, each distinguishable from transition minimized code words indicative of data. At least some of the control words can be transition maximized words. One of the control words is a "data stream separation" word that is transmitted before or after a burst of data and is indicative of the start or end of a burst and the type of data transmitted during the burst. Another one of the control words is an "isochronous data transfer" word that is a synchronization character typically transmitted at the beginning or end of a blanking interval and indicates the type of the blanking interval (e.g., horizontal or vertical) and distinguishes between the beginning and the end of the blanking interval. For example, a first isochronous data transfer word indicates the start of a vertical blanking interval, a first data stream separation word then indicates the start of a burst of data in the vertical blanking interval, a second data stream separation word then indicates the end of such data burst, and a second isochronous data transfer word then indicates the end of the vertical blanking interval. Each of the first isochronous data transfer word, the first data stream separation word, the second data stream separation word, and the second isochronous data transfer word is a transition maximized code word, a transition minimized code word can indicate each word of data of the data burst (transmitted in the vertical blanking interval), and the vertical blanking interval can be followed by an active video period comprising a third data stream separation word (indicative of the start of a stream of video data) followed by a stream of transition minimized code words indicative of the video data itself.

SUMMARY OF THE INVENTION

In a class of embodiments, the invention is a communication system including a transmitter, a receiver, and a serial link (which can but need not be a TMDS or TMDS-like link), in which encoded data (e.g., encoded video data and optionally also encoded auxiliary data) are transmitted from the transmitter to the receiver. The serial link can but need not be a TMDS or TMDS-like link. In some embodiments, alternating bursts of encoded video data and encoded auxiliary data are transmitted over each of one or more channels of a serial link. In some embodiments in which bursts of encoded video data are transmitted over a serial link, one or more bursts of encoded auxiliary data (each burst comprising a different type of encoded data) are, or no burst of encoded auxiliary data is, transmitted in each blanking interval between bursts of the encoded video data. Other aspects of the invention are transmitters for use in encoding data for transmission over a serial link, receivers for receiving and decoding encoded data transmitted over a serial link, and methods for sending encoded data over a serial link.

In accordance with the invention, the source data to be transmitted are encoded using a "robust" subset of a full set of code words. Each "robust" subset consists of code word sets (sometimes referred to herein as "golden sets"), with each golden set consisting of one or more code words (sometimes referred to herein as "golden words" or "preferred words"). Each golden word of a golden set is indicative of a single source data value (e.g., a source data word). In the case that a golden set consists of two or more golden words, each of these golden words is indicative of the same source data value. Disjoint clusters of code words in the full set are determined. Each cluster includes a "golden set" and optionally also one or more additional code words of the full set, where each of the additional code words is "similar" to a golden word of the cluster's golden set in the sense that each additional code word is likely to be generated as a result of probable bit errors in transmission, or transmission and decoding, of such golden word. Each received code word in one of the clusters is mapped to the source data value determined by the cluster's golden set. Each mapping of a cluster of received code words to a single source data value can provide error correction by mapping an error-containing word in the cluster back to the source data value most likely to correspond to the error-containing word.

The full set of code words can be used to encode one type of data (e.g., video data) for transmission over a channel of a serial link, and the robust subset can be used to encode another type of data (e.g., audio data or other "auxiliary" data related to or useful with video data) for transmission over the same channel.

In some embodiments, each code word in each golden set (and each code word in the full set) is an N-bit word that is an encoded version of an M-bit word, where M is an integer less than N. After transmission of a sequence of N-bit golden words over the serial link, each received N-bit code word can differ from one of the golden words (if a transmission error has occurred) or it can be identical to one of the transmitted golden words. Each received N-bit code word in one of the clusters is decoded to generate a decoded M-bit word, and each such decoded M-bit word is mapped to the source data value determined by the cluster's golden set.

For example, in a class of embodiments, the full set of code words is the set of 10-bit TMDS-encoded words that are indicative of 256 eight-bit source words. The robust subset of the full set consists of eight-bit "golden words" indicative of a subset of the full set of 256 eight-bit source words. In preferred embodiments in this class, the robust subset consists of sixteen golden sets, each golden set consists of the 10-bit TMDS code words indicative of one eight-bit source word, and each cluster of the 10-bit TMDS code words includes one of the golden sets and at least one 10-bit TMDS code words similar to the code words in such golden set. In such preferred embodiments, each received 10-bit code word in one of the clusters is decoded in accordance with the TMDS decoding algorithm (or a modified version of such algorithm) to recover an eight-bit word, and each recovered eight-bit word is mapped to the eight-bit source word determined by the cluster. In other words, each cluster is a set of 10-bit TMDS code words that can be decoded (in accordance with the TMDS decoding algorithm or modified version thereof) to a set of $N_i$ eight-bit words, $S_{ij}$ (including the eight-bit source word determined by the cluster), where the index "i" denotes one of the sixteen clusters, the index "j" is an integer in the range $1 \leq j \leq N_i$, and the integer $N_i$ need not be the same for all different values of the index "i." The words $S_{1j}$ consist of the source word identified by the first cluster and $N_1-1$ other eight-bit words "similar" to this source word (i.e., the first cluster consists of a single source word $S_{1j}$ determined by the first cluster, in the case that $N_1=1$), the words $S_{2j}$ consist of the source word identified by the second cluster and $N_2-1$ other eight-bit words "similar" to this source word, and so on.

Typically, the code words in the full set have equal length (e.g., each consists of N bits). The robust subset will sometimes be referred to herein as a "selected" (or "inventive") set of code words, and the code words in the robust subset will sometimes referred to as the "inventive" code words (or as "golden words"). The robust subset is selected such that each stream of encoded data (comprising only inventive code words) transmitted over a serial link has a bit pattern that is less susceptible to inter-symbol interference ("ISI") during transmission than is the bit pattern determined by a transmitted, conventionally encoded version of the same data (comprising not only inventive code words but also members of the full set that are not inventive code words). Since the inventive code words are a subset of the full code word set and each inventive code word determines one source data word, the bit rate at which source data can be transmitted over the link is lower if the transmitted data are encoded using only the inventive code words than if the transmitted data are encoded conventionally using the full code word set. This is because, in general, a set of source data bits can be grouped into a fewer number of longer source data words (each different source data word to be encoded as a different L-bit code word) when more different L-bit code words are available for encoding the source data.

In general, the best choice for the particular inventive code word set selected from a full set of binary code words depends on the particular coding implemented by the full set (i.e., the details of which bits of each code word in the full set are zeroes and which are ones). In preferred embodiments, the inventive code words are predetermined to be those whose serial patterns (during transmission) have fewer contiguous zeros and ones (e.g., on the average), and thus are less susceptible to ISI during transmission, than do those code words in the full set that are not selected (e.g., the average number of contiguous zeros and ones, per code word, of the inventive code words is less than the average number of contiguous zeros and ones, per code word, of the code words in the full set that are not selected as the inventive code words). Also, when the bits of the inventive code words are transmitted over a serial link as sequences of rising and falling voltage transitions, the bit pattern of each transmitted stream of the inventive code words preferably implements DC balancing (the voltage drift over time is limited).

Typically, the full set comprises $2^N$ binary code words (each having a length of L bits) and thus can be efficiently used to encode data words of N-bit length for transmission. Also typically, the robust subset comprises $2^M$ of these code words (each having a length of L bits), where M<N, and thus can be efficiently used to encode data words of M-bit length for transmission. In this case, in order to encode N-bit source words using the inventive code words, the N-bit source words can be buffered and packed into M-bit format. Each resulting M-bit source word can then be encoded (as an L-bit encoded word) using one of the inventive code words. Assuming that the same time is required to transmit and decode each L-bit encoded word (regardless of whether the word is a member of the robust subset), fewer source data bits can be transmitted per unit time when the source words are encoded using the inventive code words than when the source words are conventionally encoded using the full code word set. For example, to encode 8-bit source data words, the full code word set can be the set of 10-bit code words employed in a conventional TMDS link (each such code word comprising one of 256, transition-minimized, 9-bit patterns whose most significant bit indicates that the pattern is transition-minimized, concatenated with a tenth bit indicating whether the eight least-significant bits have or have not been inverted in accordance with a DC balancing algorithm). In some embodiments, the robust subset consists of sixteen selected 10-bit code words of this full set, and the nine least-significant bits of each code word in the robust subset are indicative of a different one of the 256, transition-minimized, 9-bit patterns. Thus, to encode the 8-bit source words using only the sixteen inventive code words, each 8-bit source word is split into two 4-bit portions and each 4-bit portion separately encoded as one of the inventive 10-bit code words. Thus, the rate at which the 8-bit source data can be transmitted (after being encoded using only the inventive code words) is only half the rate at which the same data can be transmitted after being encoded conventionally using the full code word set. However, the conventionally encoded data would be subject to higher rates of error (e.g., error due to ISI) during transmission than would the same data if transmitted after being encoded using only the inventive code words.

In general, by reducing the ratio of M to N in the example (in which the robust subset comprises $2^M$ code words), lower bit-error rates (BER) can be achieved in accordance with the invention at the cost of reducing the rate at which the source data can be transmitted. Conversely, increasing the ratio of M to N results in an increased source data transmission rate at the cost of a higher BER.

Encoding of data in accordance with the invention is particularly beneficial in applications in which encoded data are to be transmitted over very long conductors or under other conditions in which there would otherwise be a high risk of error due to ISI during transmission.

In some embodiments of the invention, encoded data are transmitted in bursts over the serial link, and at least one of the inventive code words is used as a "guard band" word that is transmitted at the start or end (or the start and end) of a burst of encoded data (to identify the leading and/or trailing edge of the burst) or at the start or end (or at the start and end) of each burst of encoded data of a specific type. In some such embodiments, two different guard band words are used: one for transmission at the start of each encoded data burst (to identify the leading edge of the burst); the other for transmission at the end of each encoded data burst (to identify the trailing edge of the burst). In preferred embodiments, bursts of at least two different types of encoded data (e.g., audio data or other auxiliary data, and video data) are transmitted over the serial link and P different ones (where P is greater than or equal to 2) of the inventive code words are used as P different guard band words, including: one guard band word for transmission at the start of each burst of encoded data of a first type (to identify the leading edge of such burst); and another guard band word for transmission at the start of each burst of encoded data of a second type (to identify the leading edge of such burst). For example, in some embodiments bursts of encoded video data (each identified by a first guard band word) are transmitted during active video periods, and bursts of auxiliary data (each identified by a second guard band word) are transmitted during blanking intervals between the active video periods.

In a class of systems that embody the invention, 8-bit video data words (each encoded according to the TMDS encoding algorithm as a 10-bit code word) are transmitted over a TMDS link (or other TMDS-like link having multiple channels for transmitting serial video) during active video periods in which a control signal (DE) is high, and control words (each indicative of two bits: CTL0 and CTL1, or CTL2 and CTL3) or synchronization words (each indicative of two bits: HSYNC and VSYNC) are transmitted over each of at least some of the video transmission channels during blanking intervals (in which DE is low) between the active video periods. The system is operable in a mode in which each transmitted video data word is conventionally encoded as a transition-minimized, 10-bit TMDS code word. Each such transition-minimized code word determines one of 256 different nine-bit patterns, having a most significant bit indicating that the pattern is transition-minimized, concatenated with a tenth bit indicating whether the eight least-significant bits of the nine-bit pattern have or have not been inverted in accordance with a DC balancing algorithm. Each transmitted control word (CTL1:CTL0 or CTL3:CTL2) and synchronization word (HSYNC:VSYNC) is a distinctive, 10-bit, transition-maximized word. In preferred embodiments, 4-bit words of auxiliary data (encoded in accordance with the invention) are transmitted during the blanking intervals at times when no control words or synchronization words are transmitted. The auxiliary data are typically but not necessarily audio data. In other embodiments, the system is operable in a mode in which 4-bit words of video data (encoded in accordance with the invention) are transmitted during the active video periods. To provide at least one guard band word, and for use in encoding auxiliary data in accordance with the invention for transmission in blanking intervals between active video periods, a robust subset of 17 different, transition-minimized code words is selected from the full conventional TMDS code space: sixteen 10-bit code words (each indicative of a different 4-bit auxiliary data word, and one of which is optionally also used as a guard band word at the start and end of each burst of encoded auxiliary data); and one 10-bit code word used as a guard band word (at the start and end of each active video period). Alternatively, a robust subset of 18 different, transition-minimized code words is selected from the full conventional TMDS code space: sixteen 10-bit code words (each indicative of a different 4-bit source word); and two 10-bit code words (each used as a guard band word).

In some embodiments of the invention, bursts of encoded auxiliary data and bursts of encoded video data are transmitted over a serial link, and the auxiliary data are encoded in accordance with the invention using a set of inventive code words. The set of inventive code words includes a "video" guard band word that is transmitted at the start of each encoded video data burst, and an "auxiliary" guard band word that is transmitted at the start of each encoded auxiliary data burst. In some implementations, at least one of the guard band words is also used for a second purpose: to encode auxiliary data. In preferred implementations of such embodiments, the encoded video data are transmitted during active video periods in which a control signal, DE, is high (DE=1), and encoded control (or synchronization) signals and encoded auxiliary data are transmitted during blanking intervals (in which DE=0) between active video periods. At least one video guard band word is transmitted at the start of each active video period. Each blanking interval can comprise at least one auxiliary data period (each comprising at least one auxiliary guard band word followed by a burst of encoded auxiliary data) or no auxiliary data period. Each blanking interval including at least one auxiliary data period can also comprise an "auxiliary preamble" period between the falling edge of DE (at the start of the blanking interval) and the start of the first (or only) auxiliary data period (and optionally also an additional auxiliary preamble period before each subsequent auxiliary data period in the blanking interval), and a "video preamble" period between the last auxiliary data period and the next active video period. Control (or sync) signals of a specific type are transmitted during each auxiliary preamble period. Control signals of another specific type are transmitted in each video preamble period.

BRIEF DESCRIPTION OF THE DRAWINGS

FIG. 3 is a table showing data patterns transmitted in "auxiliary preamble" and "video preamble" portions of a blanking interval, and the inventive guard band code words transmitted after such auxiliary preamble and video preamble portions, in a preferred embodiment of the invention.

FIGS. 4A and 4B are first and second parts, respectively, of a table showing a set of seventeen of the inventive code words (including two guard band words) that are employed in a preferred embodiment of the invention. The table also shows other code words that are mapped to each of these seventeen code words in accordance with this embodiment of the invention. We shall refer to FIGS. 4A and 4B collectively as "FIG. 4."

DETAILED DESCRIPTION OF THE PREFERRED EMBODIMENTS

Figure 1:
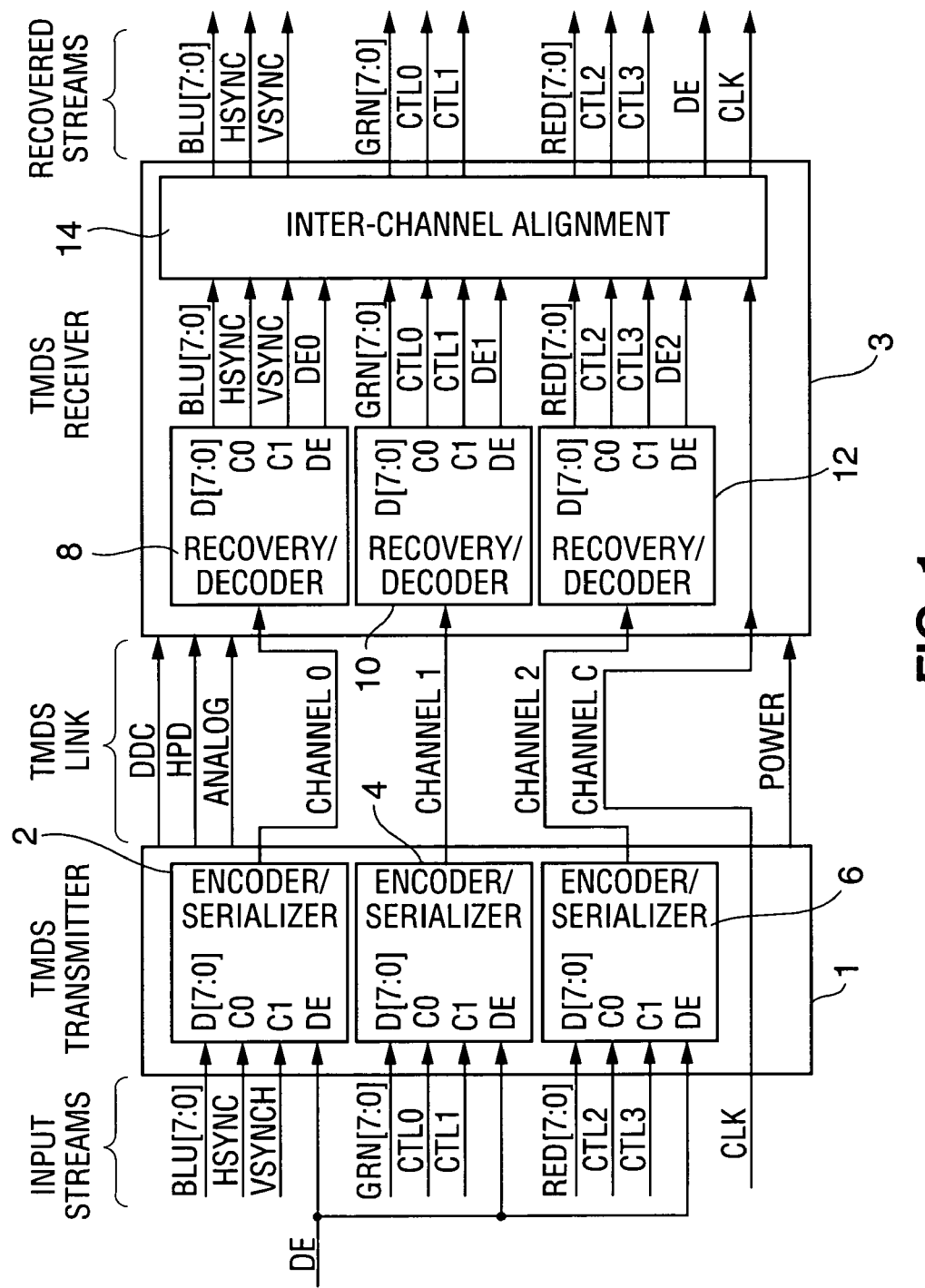
FIG. 1 is a block diagram of a conventional system including a Digital Visual Interface ("DVI") link.

During transmission of data over a serial link from a transmitter to a receiver, inter-symbol interference ("ISI") can give rise to errors that cause the received data to differ from the transmitted data. The rate at which such errors occur depends on such factors as the channel medium, and when the data are patterns of binary bits, the particular bit patterns that are transmitted. In accordance with the invention, data are encoded for transmission over a serial link with bit patterns that are less susceptible to ISI during transmission over the link than are the patterns determined by conventionally encoded versions of the same data. Thus, the data are transmitted more reliably in accordance with the invention, and with reduced error rate, than are conventionally encoded versions of the same data. More specifically, data are encoded in accordance with the invention using a subset (a "robust" subset) of a full set of code words. Typically, the code words in the full set have equal length (e.g., each consists of N bits). The robust subset will sometimes be referred to herein as a "selected" or "inventive" set of code words, and the code words in the robust subset will sometimes referred to as the "inventive" code words. The robust subset is selected such that each transmitted stream of encoded data (coded using only members of the inventive code word set) has patterns that are less susceptible to ISI during transmission over the serial link than are patterns determined by a transmitted, conventionally encoded version of the same data (that has been coded using code words of the full set other than members of the inventive code word set, as well as members of the inventive code word set). Since there are more code words in the full set than there are inventive code words, fewer words of data can be transmitted over the link per unit time if the transmitted data are encoded using only the inventive code words than if the transmitted data are encoded conventionally using the full set of code words.

Encoding of data in accordance with the invention is particularly beneficial in applications in which the encoded data are transmitted over very long conductors or under other conditions in which there would otherwise be a high risk of error due to ISI during transmission.

It should be appreciated that the term "transmitter" is used herein in a broad sense to denote any unit capable of encoding data and transmitting the encoded data over a serial link (and optionally also encrypting the data to be transmitted), and the term "receiver" is used herein in a broad sense to denote any unit capable of receiving data and decoding that has been transmitted over a serial link (and optionally also decrypting the received data). For example, the term transmitter can denote a transceiver that performs the functions of a receiver as well as the functions of a transmitter. In a more specific example, the term transmitter (with reference to a unit that transmits non-audio auxiliary data over a TMDS-like link or other serial link) can denote a transceiver that is configured to receive video data and audio data over the link and to transmit the non-audio auxiliary data over the link.

As noted above, the term "stream" of data (as used herein) denotes that all the data are of the same type and are transmitted with the same clock frequency, and the term "channel" (as used herein) refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

When transmitting audio (or other auxiliary) data via a serial link, is it often desired to transmit multiple streams of the auxiliary data, and it is often valuable for multiple channels of the link to be available for transmission of the auxiliary data. For example, there can be two audio streams (left and right streams of stereo audio), six streams (e.g., those of "5.1" surround sound), or up to eight streams (e.g., those of "7.1" surround sound). Alternatively, it may be desired to transmit even more streams of audio data with video, or to transmit streams of non-audio auxiliary data (for providing non-audio effects that are synchronized to the video) with audio and video. All such streams of auxiliary data are typically on the same time base, but alternatively there can be a need for some of the audio (or other auxiliary) data to be based upon another time base, or to have a different sampling rate. For example transmission of six streams of pulse code modulated (PCM) audio data over the link can be based upon one clock. Another two streams of compressed audio data, possibly a down-mix (for playback on a reduced number of speakers), might be transmitted with the video and PCM data as well.

In high-speed serial digital data transmission the data are often encoded to maximize or minimize the number of transitions and to also balance the DC level. For example, in systems including at least one of the above-referenced TMDS links, transition-minimized, DC-balanced, TMDS encoded video data are transmitted over each of three channels of at least one TMDS link, and encoded auxiliary data (e.g., audio data) can be transmitted over one or more of these three channels during blanking intervals between the active video periods. When the bandwidth requirement of the auxiliary data is lower than that of the primary data (video data) and the auxiliary data channel has significant ISI (which can result from a long cable), then the auxiliary data are desirably encoded using the inventive encoding scheme to achieve a lower bit-error rate during transmission.

In a class of preferred embodiments, auxiliary data are encoded in accordance with the invention (for transmission over a TMDS link) using a subset of the transition-minimized TMDS code words that are conventionally used to encode video data for transmission over the link. These and/or other embodiments of the invention can be implemented by a system of a type to be described with reference to FIG. 2. The FIG. 2 system is identical to that of FIG. 1, except in that it is configured to encode auxiliary data (or other auxiliary data) in accordance with the invention (and also to encode video data in the same conventional manner as in the FIG. 1 system), transmit the encoded data over one or more of Channel 0, Channel 1, and Channel 2 (and also to transmit encoded video data over each such channel), and decode the encoded auxiliary data (as well as the encoded video data). Transmitter 1' and receiver 2' of FIG. 2 correspond, respectively, to transmitter 1 and receiver 3 of FIG. 1 (but perform auxiliary data encoding, transmission, and decoding functions that are not performed by transmitter 1 and receiver 3 of FIG. 1). The TMDS link between transmitters 1' and 2' in FIG. 2 is identical to the TMDS link between transmitters 1 and 3 in FIG. 1, although some of the conductors thereof are shown in FIG. 1 but not in FIG. 2 (for simplicity).

Figure 2:
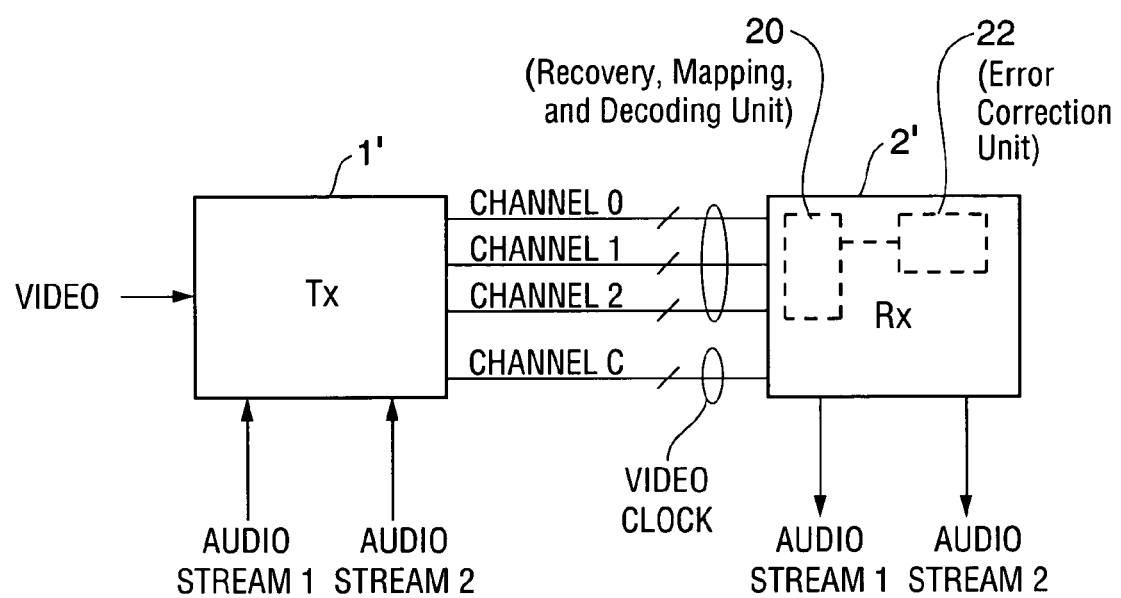
FIG. 2 is a block diagram of a first embodiment of the inventive system.

The FIG. 2 system preferably transmits a video clock over a conductor pair (labeled "Channel C in FIG. 2) of the TMDS link, and also transmits a clock for the auxiliary data over at least one channel of the link. For example, transmitter 1' transmits video data to receiver 2' over Channels 0, 1, and 2 (which are identical to the identically numbered channels of the FIG. 1 system) except during video blanking intervals, transmits two streams of audio data (e.g., left and right stereo signals) over any two of Channels 0, 1, and 2 to receiver 2' during the video blanking intervals, continuously transmits a video clock (e.g., determined by the rising edges of a binary waveform) over Channel C, and transmits time stamp data with each burst of the audio data. The time stamp data determine a clock for the audio data, as described in above-cited U.S. patent application Ser. No. 09/954,663, filed on Sep. 12, 2001. Receiver 2' is configured to process the time stamp data to recover the audio clock employed to transmit the audio data.

Typically the clock for a stream of audio data has a much lower frequency than the pixel clock for a stream of video. However, in most applications the audio clock needs to be more accurate than the pixel clock, to reduce jitter. This is true since distortion in analog audio (that has been generated from digital audio data having jitter) is more easily discernible (to one experiencing the analog audio) than is the distortion in a displayed video program generated from digital video having the same amount of jitter.

In the FIG. 2 system, 8-bit source words of video data are encoded into 10-bit code words which are then serialized and transmitted over a channel medium (one of the conductor pairs identified as Channels 0, 1, and 2). In receiver 2', each 10-bit code word is decoded back to the original 8-bit word if no errors are present. Each code word comprises a 9-bit base pattern (a transition-minimized member of a set of $2^9$ nine-bit patterns, whose most significant bit indicates that the base pattern is transition-minimized, concatenated with a tenth bit indicating whether the eight least-significant bits of the base pattern have or have not been inverted in accordance with a DC balancing algorithm). In transmitter 1', each 8-bit source word is first encoded to one of the 9-bit base patterns, and a stream of the 9-bit base patterns are then encoded as a stream of the 10-bit code words (in a manner that achieves improved DC balancing of the transmitted stream of 10-bit code words). However, the decoded video data can include errors (especially when the relevant channel has significant ISI), depending on the specific channel media and the specific data patterns of the transmitted serial bit stream.

If transmitter 1' and receiver 2' were operated to encode and decode the auxiliary data in the same way that they encode and decode the video data, and to send both types of encoded data over the same channel of the serial link, the decoded auxiliary data would be subject to error at the same error rate. This error rate can be unacceptably high for auxiliary data (especially when the auxiliary data are audio data), even if it is acceptable for video data. To reduce the error rate for the auxiliary data, transmitter 1' can be configured to encode the auxiliary data in accordance with the invention. Optionally, transmitter 1' can be configured also to encode the video data in accordance with the invention (or to be operable in a mode in which it encodes both the video data and auxiliary data in accordance with the invention). However, since data encoded in accordance with the invention (with a robust subset of a "full set" of code words) necessarily has a lower data transmission rate than the same data encoded in a conventional manner (using the same "full set" of code words, assuming that both streams of encoded bits are transmitted with the same clock frequency). In many applications, video data cannot practically be transmitted at an adequate rate if encoded in accordance with the invention. Thus, typical implementations of the FIG. 2 system will encode auxiliary data (but not video data) in accordance with the invention.

In a class of embodiments, transmitter 1' is configured to encode the auxiliary data in accordance with the invention as follows. A subset of the full set of 10-bit TMDS code words is selected as the "inventive" code word set such that each transmitted stream of 10-bit words of encoded auxiliary data (consisting only of the inventive code words) has a pattern that is less susceptible to inter-symbol interference than is the pattern determined by a transmitted stream of a TMDS-encoded version of the same data (including not only inventive code words but also members of the full set that are not inventive code words).

In some embodiments, a $2^M$-bit subset (where M<8) of the full set of 10-bit TMDS code words is selected to be the inventive code word set. Optionally, the inventive code word set also includes one or more code words of the full set that are used as guard band words. The 17 inventive code words (each comprising 10 bits) to be described below with reference to FIGS. 3 and 4 are an example of such a $2^M$-bit subset (where M=4) supplemented by one additional guard band word. Receiver 2' is implemented to decode each received one of the inventive 10-bit code words as an auxiliary data word of length M bits. Receiver 2' performs the same decoding operations on the encoded auxiliary words received during blanking intervals that it performs on the conventionally encoded video words received during the active video periods. However, during the encoding of source auxiliary data (using the inventive code words), transmitter 1' does not perform the conventional DC balancing steps that it performs during its conventional encoding of source video data (in which the eight least significant bits of the "N+1"th encoded video word are inverted, and the resulting nine bits are concatenated with a distinctive tenth, most significant bit when the cumulative DC drift of the N previous encoded video words reaches a predetermined threshold, and otherwise does not invert the eight least significant bits of the "N+1"th encoded video word and instead concatenates the word with another distinctive, tenth, most significant bit). Rather, transmitter 1' is configured simply to replace each 4-bit source word of auxiliary data with the corresponding one of the inventive code words, regardless of the cumulative DC drift of the resulting stream of inventive code words (and regardless of whether the MSB of the inventive code word is a one or zero). The inventive code words are preferably chosen so that when the bits of a stream of the inventive code words are transmitted over a serial link as sequence of rising and falling voltage transitions, the bit pattern of such stream of the inventive code words is DC balanced (or is likely to be DC balanced) in the sense that the voltage drift that it determines over time is limited to an acceptable amount.

In other embodiments, transmitter 1' does perform the same DC balancing steps during its encoding of source auxiliary data (using the inventive code words) and during its conventional encoding of source video data. This is taken into consideration in the selection of the inventive code word set. Specifically, each code word of the inventive code word set has a 9-bit base pattern that is a member of a selected subset of the 9-bit base pattern space of the full set of 10-bit TMDS code words, and during encoding of 4-bit words of source auxiliary data (to replace them with the inventive 10-bit code words), the eight least-significant bits of this 9-bit base pattern are either inverted and the resulting pattern concatenated with a tenth (and most significant) bit having a first value, or the base pattern is not inverted and is instead concatenated with a tenth (and most significant) bit having a second value, depending on whether the cumulative DC drift of the stream of previously encoded auxiliary words has reached a predetermined threshold. In these embodiments, receiver 2' is implemented to perform the same decoding operations on the encoded auxiliary data words received during blanking intervals that it performs on the conventionally encoded video data words received during the active video periods, and then to map each 8-bit word (generated as a result of conventional decoding of one of the 10-bit encoded auxiliary data words) to one of the $2^M$ auxiliary data words each having M-bit length.

In the described embodiments of the FIG. 2 system, the size of the auxiliary data encoding space (the number of different auxiliary data words that can be encoded with the inventive code word set) is reduced from $2^8$ (=256) to $2^M$ (where M<8) in accordance with the invention, and thus the effective rate at which the auxiliary data (encoded in accordance with the invention) can be transmitted is reduced from 8 bits per clock period per channel to M bits per clock period per channel. By reducing the value M (i.e., selecting a smaller inventive set of code words from the full set), a lower bit-error rate (BER) can be achieved but the data rate will also be reduced. Conversely, increasing the parameter M results in an increased data rate but at the cost of increased BER.

We next describe an embodiment of the inventive code word set with reference to FIGS. 3 and 4. This code word set is a subset of the full set of conventional TMDS 10-bit code words, and is useful for encoding 4-bit words of auxiliary data for transmission over a TMDS (or TMDS-like) link over which 8-bit video words (conventionally encoded using the full set of TMDS 10-bit code words) are also transmitted, in cases when it is adequate to transmit the auxiliary data at half the data rate as the video data. Typically, 8-bit input words of binary auxiliary data are buffered, the four least-significant bits of each are encoded (e.g., in transmitter 1' of FIG. 2) as one of the sixteen 8-bit words "AD0-AD15" in the left column (labeled "Input D7-D0") of FIG. 4, and the four most significant bits of each 8-bit input word are also encoded as the appropriate one of the sixteen 8-bit words AD0-AD15. Each of the words AD0-AD15 has the hexadecimal representation shown in FIG. 4 in the second column from the left. Each of the words AD0-AD15 is then encoded (e.g., in transmitter 1') as the corresponding one of the 10-bit patterns shown in the third column (labeled "TMDS result") of FIG. 4. We shall describe the other columns of FIG. 4 below, with reference to the aspects of the invention that pertain to the mapping of code word clusters.

In FIG. 4 (and FIG. 3), the left bit of each code word is the LSB and (in the case of each 10-bit code word) is the first bit to be transmitted over the serial link. Also, the right bit of each code word is the MSB and (in the case of each 10-bit code word) is the last bit to be transmitted over the serial link.

For example, an input auxiliary data word 10000000 (whose LSB is 1) would be split into two halves (1000 and 0000) and the two halves then encoded as AD1 and AD0, respectively. Then, the 8-bit word AD0 is encoded as the 10-bit inventive word "0011100101" and the 8-bit word AD1 is encoded as the 10-bit inventive word "0110001101." The two inventive words would then be serialized transmitted over the serial link sequentially, with the bits "0011100101" indicative of the "most significant" half (0000) of the input word being transmitted before the bits "0110001101" that are indicative of the least significant half (1000) of the input word. At the receiver, each 10-bit inventive word is decoded into one of the 8-bit words AD0-AD15, and the original 8-bit input auxiliary data words can be reconstructed from the recovered words AD0-AD15 since there is a one-to-one mapping between each word AD0-AD15 and one half (four bits) of each 8-bit input auxiliary data word.

Of course, the input auxiliary data asserted to the transmitter (e.g., transmitter 1') can be 4-bit words, in which case the transmitter would not need to split (or otherwise pack) received input auxiliary data words into 4-bit format before encoding them as a sequence of the words AD0-AD15. Alternatively, the input auxiliary data can be pre-encoded as a sequence of 8-bit words AD0-AD15, and the pre-encoded auxiliary data then provided to the transmitter in the form of a sequence of the 8-bit words AD0-AD15.

Figure 5:
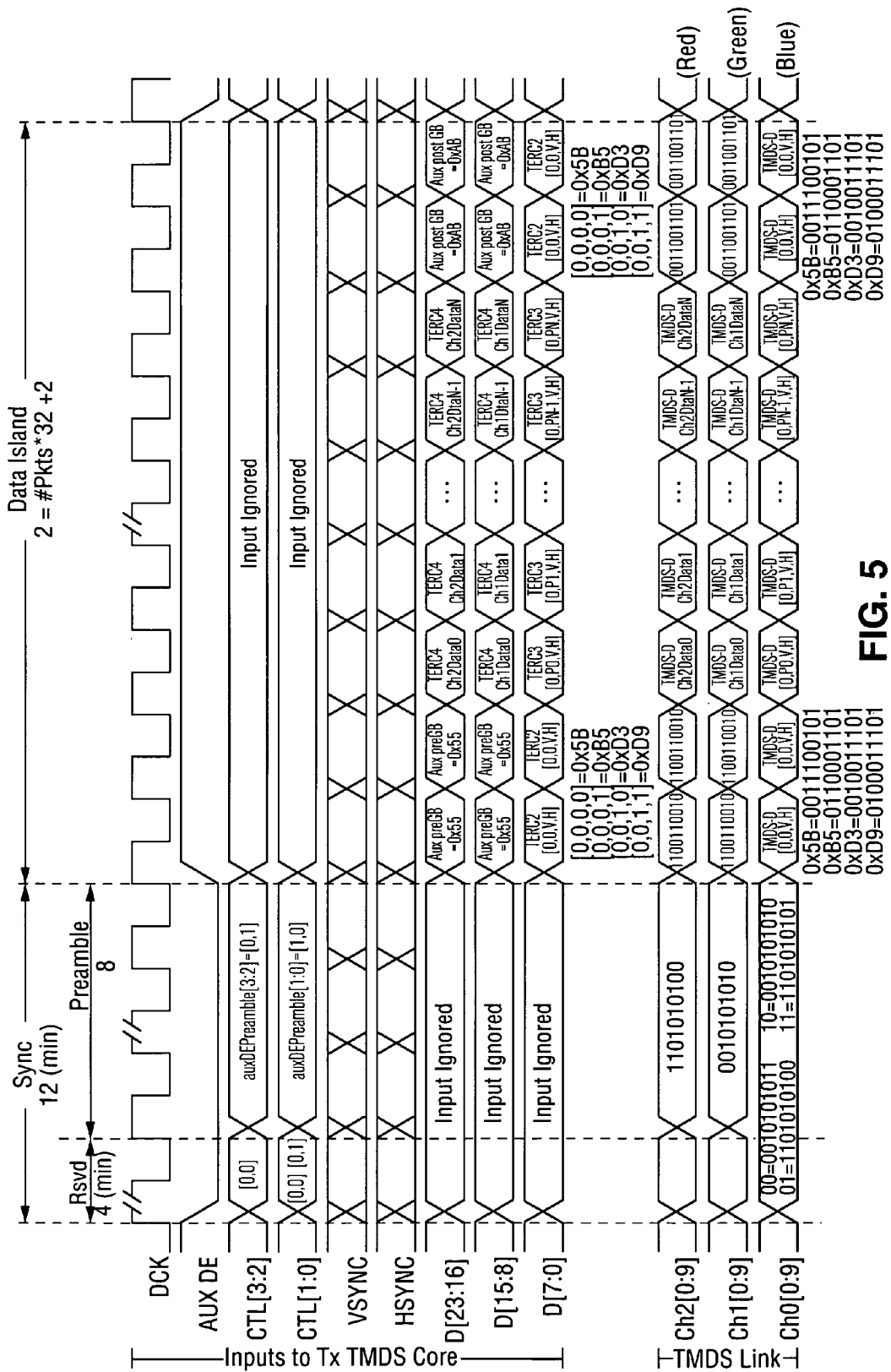
FIG. 5 is a timing diagram of signals input to the transmitter during a video blanking interval of an embodiment of the inventive system, and encoded signals transmitted over a TMDS link of such system in response thereto.
Figure 6:
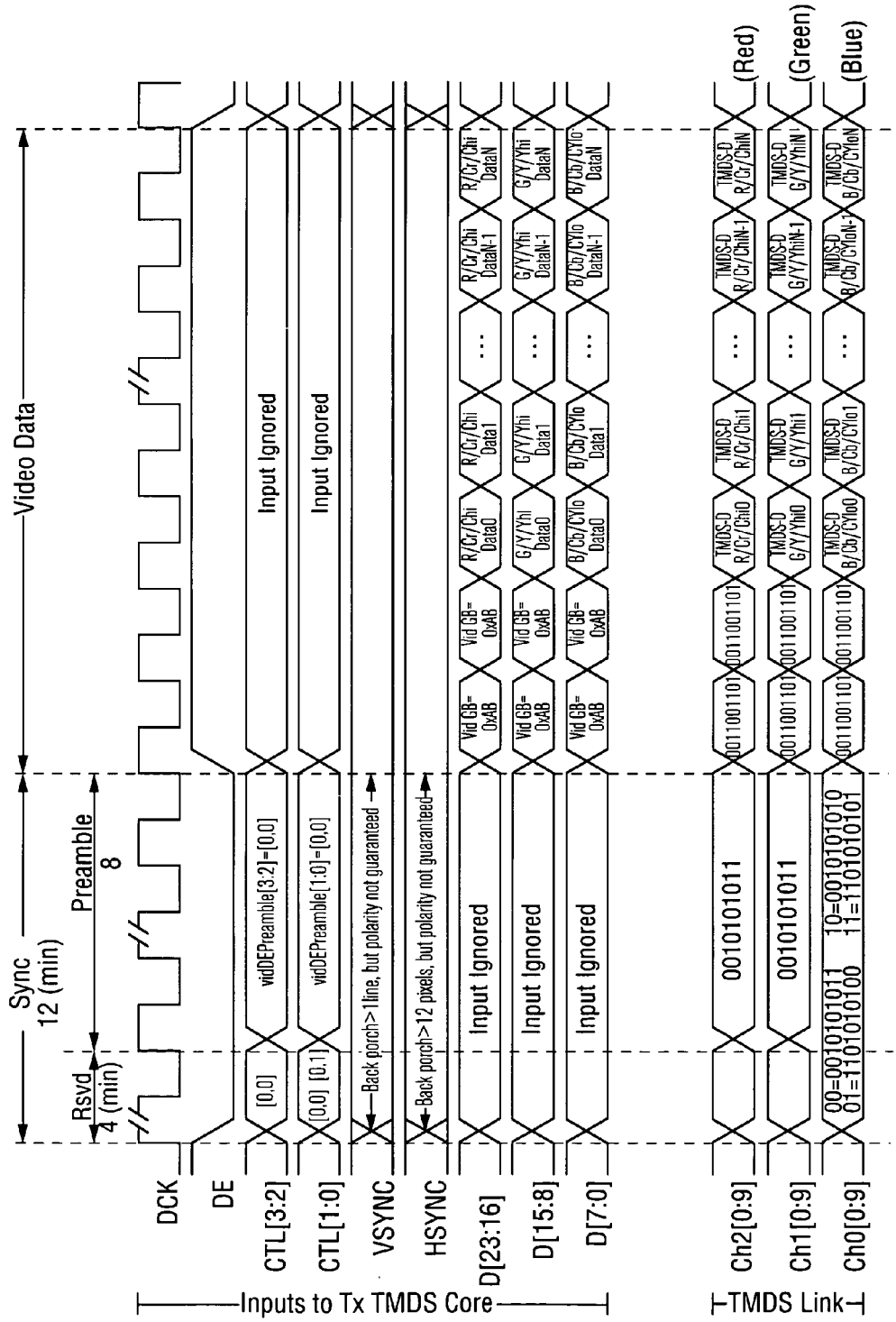
FIG. 6 is a timing diagram of signals input to the transmitter during the video preamble portion of a video blanking interval (and during a subsequent active video period) of an embodiment of the inventive system, and encoded signals transmitted over a TMDS link of such system in response thereto.

Typically, the encoded auxiliary data are transmitted in the same channels (CH0, CH1, and CH2) of a TMDS link in which video data are transmitted, but the auxiliary data are transmitted during the blanking intervals (in which DE=0) between the active video periods (in which DE=1) of video data transmission. FIGS. 5 and 6 are timing diagrams of signals transmitted during such an embodiment of the invention. The upper nine signals of FIG. 5 represent signals input to the transmitter during a blanking interval, and the lower three signals of FIG. 5 represent the auxiliary data (encoded using the 10-bit words of FIG. 4) and encoded control and sync signals (to be discussed below) that are transmitted over channels CH0, CH1, and CH2 during the blanking interval in response to the upper nine signals. Similarly, the upper nine signals of FIG. 6 represent signals input to the transmitter at the end of the blanking interval (of FIG. 5) and during the active video period that follows such blanking interval, and the lower three signals of FIG. 6 represent the auxiliary data (encoded using the 10-bit words of FIG. 4), video data (conventionally encoded), and encoded control and sync signals (to be discussed below) that are transmitted over channels CH0, CH1, and CH2 in response to the upper nine signals.

In FIGS. 5 and 6:

24-bit words of input data are provided to the encoding circuitry of the transmitter for encoding. FIG. 5 pertains to those of such words (each identified as D[23:0] in FIG. 5) that are words of auxiliary data. FIG. 6 pertains to those of such words (each identified as D[23:0] in FIG. 6) that are words of video data. Eight bits of each input word (D[23:16]) are encoded, serialized, and transmitted on channel CH2 (as 10-bit encoded words CH2[0:9]), another eight bits of each such word (D[15:8]) are encoded, serialized, and transmitted on channel CH1 (as 10-bit encoded words CH1[0:9]) and another eight bits of each such word (D[7:0]) are encoded, serialized, and transmitted on channel CH0 (as 10-bit encoded words CH0[0:9]). In some implementations, the video data are in RGB format (and the red, green, and blue pixels are transmitted on channels CH2, CH1, and CH0, respectively). In view of this, channels CH2, CH1, and CH0, are sometimes referred to herein (such as in FIG. 3) as the red (or "R") channel, the green (or "G") channel, and the blue (or "B") channel, respectively. Alternatively, the video data that are encoded (and then transmitted) are in luminance-chrominance format;

the waveform "DCK" indicates the data clock. During each cycle of the data clock, the ten bits of each one of the inventive code words indicative of auxiliary data (or a guard band), or each of the conventional TMDS 10-bit code words indicative of video data, are sequentially transmitted over the relevant one of channels CH0, CH1, and CH2. In some actual implementations, phase shifting circuitry is used to generate multiple, phase-shifted versions of the clock DCK which are then used (with the clock DCK itself) to clock the encoding, transmission, and decoding operations. In other actual implementations, a clock having ten times the frequency of DCK (but in phase with DCK) could be used to clock the encoding, transmission, and decoding operations, and one code bit would be transmitted during each cycle of this faster clock;

the waveform "DE" (of FIG. 6) is the video data enable signal, and the waveform "AUX DE" (of FIG. 5) is the auxiliary data enable signal. When DE=1 and AUX DE=0, video data (identified as D[23:16], D[15:8], and D[7:0] in FIG. 6) are encoded, and serialized 10-bit words of the encoded video are transmitted over channels CH0, CH1, and CH2. When DE=0 and AUX DE=1, auxiliary data (identified as D[23:16], D[15:8], and D[7:0] in FIG. 5) are encoded, and serialized 10-bit words of the encoded auxiliary data are transmitted over channels CH0, CH1, and CH2. When DE=0 and AUX DE=0, the transmitter ignores signals asserted to its data inputs and instead encodes (as 10-bit TMDS code words) control bit pairs asserted to its control inputs (bits CTL3 and CTL2, indicated as "CTL[3:2]" in FIGS. 5 and 6, and bits CTL1 and CTL0, indicated as "CTL[1:0]" in FIGS. 5 and 6), serializes these code words, and transmits the serialized code words over channels CH1 and CH2, and encodes (as 10-bit transition-maximized words) sync bit pairs (HSYNC and VSYNC) asserted to its sync inputs, serializes these code words, and transmits the serialized code words over channel CH0.

More specifically, each blanking interval (each interval in which DE=0) has at least three portions: an initial portion (an "auxiliary preamble") followed by an auxiliary data portion followed by a final portion (a "video preamble"). Optionally, there are two or more auxiliary data periods in a blanking interval (each comprising at least one auxiliary guard band word followed by a burst of a different channel of encoded auxiliary data), an initial auxiliary preamble between the falling edge of DE (at the start of the blanking interval) and the start of the first auxiliary data portion, an additional auxiliary preamble before each subsequent auxiliary data period in the blanking interval, and a video preamble between the last auxiliary data period and the next active video period. During the initial auxiliary preamble of each blanking interval, repetitions of code words indicative of specific patterns of control bits CTL3, CTL2, CTL1, and CTL0, repetitions of code words indicative of any pattern of sync bits HSYNC and VSYNC, and optionally also initial bit patterns (e.g., patterns in the time interval labeled "Rsvd" in FIG. 5 at the start of the initial auxiliary preamble of channels CH2 and CH1) are transmitted. During the video preamble of each blanking interval, repetitions of code words indicative of other specific patterns of control bits CTL3, CTL2, CTL1, and CTL0, repetitions of code words indicative of any pattern of sync bits HSYNC and VSYNC, and optionally also initial bit patterns (e.g., patterns in the time interval labeled "Rsvd" in FIG. 6 at the start of the video preamble of channels CH2 and CH1) are transmitted. During the auxiliary data portion of each of at least some of the blanking intervals, the inventive code words (indicative of encoded auxiliary data) and guard band words are transmitted.

More specifically, the following signals are transmitted during the video preamble (as indicated in FIGS. 3 and 6): repetitions of a code word, "0010101011" indicative of CTL3=0, CTL2=0 are transmitted on CH2 (preferably after an initial bit pattern in the "Rsvd" interval), repetitions of the same code word, "0010101011" indicative of CTL1=0, CTL0=0 are transmitted on CH1(preferably after an initial bit pattern), and repetitions of a code word indicative of one of the four possible combinations of sync bits HSYNC and VSYNC are transmitted on CH0. In typical operation, during the final 12 pixel clock cycles of the video preamble Oust before the 0-to-1 transition of DE as shown in FIG. 6), both sync bits HSYNC and VSYNC have the value 0, so that the code word indicative of HSYNC=0, VSYNC=0 (namely the code word "0010101011" shown at the bottom of FIG. 6) is transmitted over the channel CH0.

The following signals are transmitted during the initial auxiliary preamble (as indicated in FIGS. 3 and 5): repetitions of a code word, "1101010100" indicative of CTL3=0, CTL2=1 are transmitted on CH2 (preferably after an initial bit pattern in the "Rsvd" interval), repetitions of the code word, "0010101010" indicative of CTL1=1, CTL0=0 are transmitted on CH1 preferably after an initial bit pattern), and repetitions of a code word indicative of one of the four possible combinations of sync bits HSYNC and VSYNC are transmitted on CH0. Typically, during a "VSYNC" period of the initial auxiliary preamble (the VSYNC window of FIG. 3), code words of specific values of CTL3, CTL2, CTL1, CTL0, VSYNC, and HSYNC (as shown in FIG. 3) are transmitted on channels CH2, CH1, and CH0.

In cases in which two or more types of auxiliary data are transmitted over the same channel (e.g., CH1 or CH2), a separate auxiliary data enable signal can be employed to enable the transmission of each type of auxiliary data (e.g., a signal "AUX1 DE" for auxiliary data of a first type and a signal "AUX2 DE" for auxiliary data of a second type).

Although FIGS. 5 and 6 have been described with reference to two data enable signals, "DE" and "AUX DE," it is contemplated that the transmitter can be implemented with a portion (a "core") configured to perform all the described encoding, serialization, and transmission in response to a single data enable signal (e.g., a combined enable signal indicative of the result of performing a logical "OR" operation on the signals DE and AUX DE), and a single set of data inputs (D[23:0]) indicative of either video or auxiliary data. Additional circuitry of the transmitter outside the core is configured to receive separate sets of auxiliary data (e.g., 24-bit auxiliary data words) and video data (e.g., 24-bit video data words), and both a video data enable signal DE, and an auxiliary data enable signal "AUX DE." The data enable signals can have the following repeating sequence of values: (DE=0, AUX DE=0), then (DE=1, AUX DE=0), then (DE=0, AUX DE=0), and then (DE=0, AUX DE =1). Of course, the data enable signals can also occur with other sequences of values, including non-repeating sequences. For example, in some circumstances, auxiliary data are transmitted in some but not all video blanking intervals. Thus, auxiliary data can be transmitted in one blanking interval but not the next blanking interval, with the signals DE and AUX DE having the following sequence of values: (DE=0, AUX DE=0), then (DE =1, AUX DE=0), then (DE=0, AUX DE=0), then (DE=0, AUX DE=1), then (DE=0, AUX DE=0), then (DE=1, AUX DE=0), then (DE=0, AUX DE =0), and then (DE=1, AUX DE=0). The additional circuitry of the transmitter can include logic circuitry that "ORs" together the signals DE and AUX DE to produce a combined data enable signal. The additional circuitry can also pack the auxiliary data into 4-bit format, encode each 4-bit portion of the auxiliary data as one of the words AD0-AD15 shown in FIG. 4, add guard band words with appropriate timing into the stream of AD0-AD15 auxiliary data words, and add video guard band words into the stream of video data (or alternatively replace, with appropriate timing, words of the video data with video guard band words). The additional circuitry can assert a sequence of bursts of the video data (with video guard band words) and auxiliary data (with guard band words) to the core (e.g., alternating bursts of the video data with video guard band words, and auxiliary data with guard band words), and also assert the combined data enable signal to the core. The core performs all the encoding, serialization, and transmission operations described with reference to FIGS. 5 and 6 in response to the combined data enable signal (rather than separate DE and AUX DE signals) and the bursts of video and auxiliary data.

In variations on the embodiments described in the previous paragraph, the "additional circuitry" of the transmitter is coupled and configured to receive and encode two or more sets of auxiliary data (each set comprising a different type of auxiliary data). The additional circuitry is also coupled and configured to receive a set of video data, an auxiliary data enable signal for each set of auxiliary data (e.g., first and second auxiliary data enable signals "AUX1 DE" and "AUX2 DE") and a video data enable signal ("DE"), and to assert a sequence of bursts of the video data and bursts of the encoded auxiliary data to the transmitter's core. The video data enable signal ("DE") and auxiliary data enable signals ("AUX1 DE" and "AUX2 DE") can have the following repeating sequence of values: (DE=0, AUX1 DE=0, AUX2 DE=0), then (DE=1, AUX1 DE=0, AUX2 DE=0), then (DE=0, AUX1 DE=0, AUX2 DE=0), then (DE=0, AUX1 DE=1, AUX2 DE=0), and then (DE=0, AUX1 DE=0, AUX2 DE=1). The additional circuitry can include logic circuitry that "ORs" together the signals DE, AUX1 DE, and AUX2 DE to produce a combined data enable signal, and can assert the combined data enable signal (rather than the individual video data enable and auxiliary data enable signals) to the core.

In each of at least one channel of a serial link (e.g., in each of channels CH2 and CH1 in the case of data transmission in accordance with the invention over a TMDS link), an appropriate one of the inventive code words is (or two or more appropriate ones of the inventive guard band words are) preferably transmitted (as a guard band word or set of guard band words) at the start of each burst of encoded auxiliary data (i.e., immediately after each "auxiliary preamble" of each blanking interval), at the end of each burst of encoded auxiliary data, and at the start of each burst of encoded video data (i.e., immediately after the "video preamble" of each blanking interval).

In accordance with the invention, the source data to be transmitted are encoded using a "robust" subset of a full set of code words. Each "robust" subset consists of code word sets (sometimes referred to herein as "golden sets"), with each golden set consisting of one or more code words (sometimes referred to herein as "golden words"). Each "golden word" of a golden set is indicative of a single source data value (e.g., a source data word). In the case that a golden set consists of two or more golden words, each of these golden words is indicative of the same source data value. Clusters of code words in the full set are determined. Each cluster includes a "golden set" and optionally also one or more additional code words of the full set, where each of the additional code words is "similar" to a golden word of the cluster's golden set in the sense that each additional code word is likely to be generated as a result of probable bit errors in transmission, or transmission and decoding, of such golden word. Each received code word in one of the clusters is mapped to the source data value determined by the cluster's golden set. Each mapping of a cluster of received code words to a single source data value can provide error correction by mapping an error-containing word in the cluster back to the source data value most likely to correspond to the error-containing word.

The full set of code words can be used to encode one type of data (e.g., video data) for transmission over a channel of a serial link, and the robust subset can be used to encode another type of data (e.g., audio data or other "auxiliary" data related to or useful with video data) for transmission over the same channel.

In some embodiments, each code word in each golden set (and each code word in the full set) is an N-bit word that is an encoded version of an M-bit word, where M is an integer less than N. After transmission of a sequence of N-bit golden words over the serial link, each received N-bit code word can differ from one of the golden words (if a transmission error has occurred) or it can be identical to one of the transmitted golden words. Each received N-bit code word in one of the clusters is decoded to generate a decoded M-bit word, and each such decoded M-bit word is mapped to the source data value determined by the cluster's golden set.

For example, in a class of embodiments, the full set of code words is the set of 10-bit TMDS-encoded words that are indicative of 256 eight-bit source words. The robust subset of the full set consists of eight-bit "golden words" indicative of a subset of the full set of 256 eight-bit source words. In preferred embodiments in this class, the robust subset consists of sixteen golden sets, each golden set consists of the 10-bit TMDS code words indicative of one eight-bit source word, and each cluster of the 10-bit TMDS code words includes one of the golden sets and at least one 10-bit TMDS code words similar to the code words in such golden set. In such preferred embodiments, each received 10-bit code word in one of the clusters is decoded in accordance with the TMDS decoding algorithm (or a modified version thereof) to recover an eight-bit word, and each recovered eight-bit word is mapped to the eight-bit source word determined by the cluster.

Figure 7:
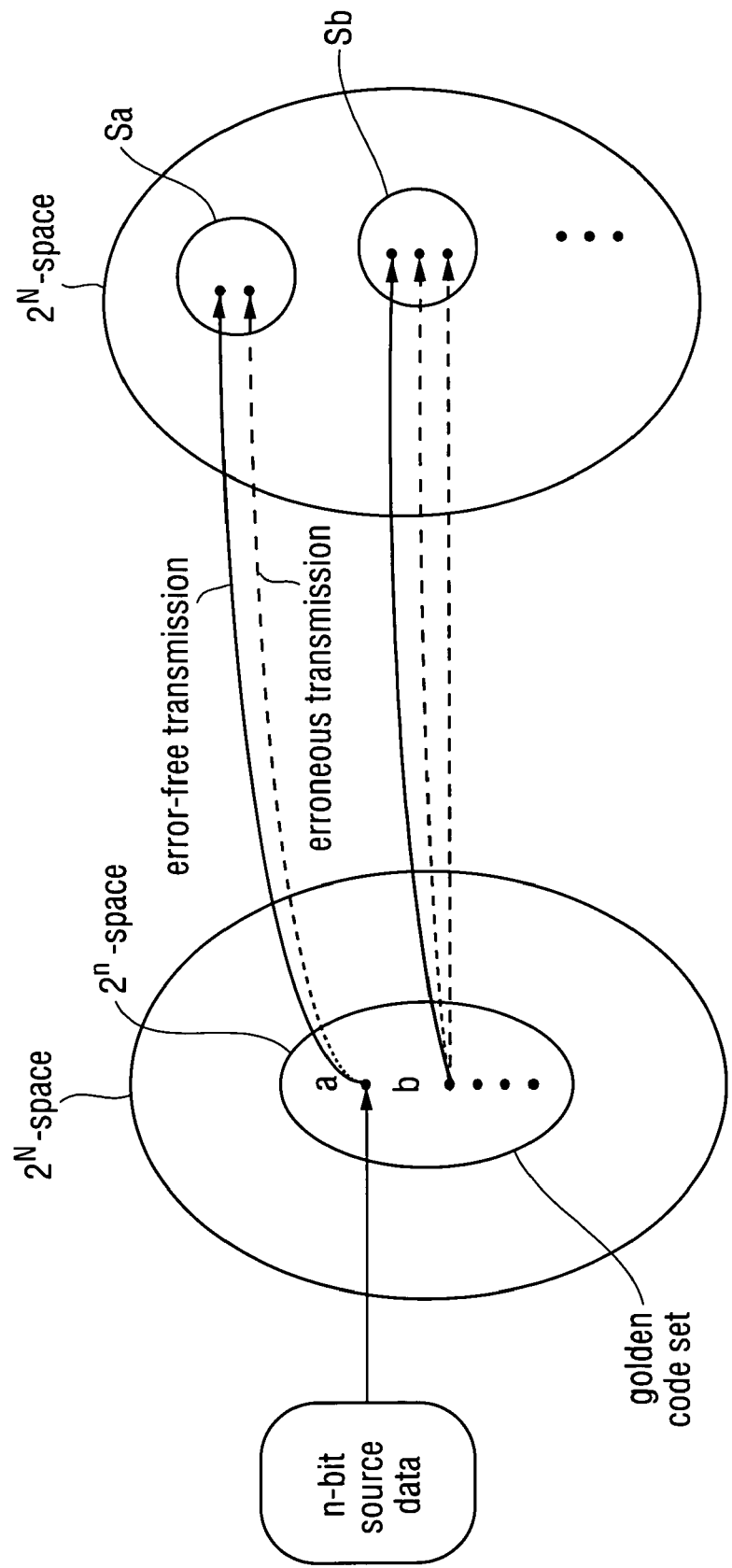
FIG. 7 is a diagram of a mapping of clusters (e.g., clusters $S_a$ and $S_b$) of received code words to individual transmitted code words (e.g., code words "a" and "b") in accordance with the invention.

With reference to FIG. 7, we will further describe the concept of mapping of clusters (e.g., clusters $S_a$ and $S_b$ in FIG. 7) of received words to individual transmitted source data words (e.g., words "a" and "b") in accordance with the invention. Then, we will describe a specific example of such mapping with reference to FIG. 4.

With reference to FIG. 7, the full set of code words (which can be used to encode primary data, for example when auxiliary data are encoded in accordance with the invention using only "golden words" of the full set) are those code words (the "$2^N$ space") that can be used to encode $2^N$ different source data words, each source data word being an ordered set of N bits. The golden words (the "$2^n$ space") are a subset of the code words of the full set that can be used to encode $2^n$ different source data words, each such source data word being an ordered set of "n" bits (where "n" is an integer less than N). Initially, raw source data (which can consist of words of any length) can be buffered and packed into an n-bit format (i.e., into n-bit members of a set of $2^n$ source data words). Each different n-bit source data word can then be encoded as one of the golden words (in the "$2^n$ space") and transmitted over a serial link (typically over a single channel of the link). The transmission can result in error or it can be error free.

Clusters of the full set of code words are predetermined such that each cluster includes a "golden set" (of one or more of the golden words) and optionally also one or more additional code words of the full set, where each of the additional code words is similar to a golden word of the cluster's golden set. In FIG. 7, for example, cluster "$S_a$" includes the golden set consisting of each of the golden words that encodes source word "a," and cluster "$S_b$" includes the golden set consisting of each of the golden words that encodes source word "b"). Each received code word in one of the clusters is mapped to the source data value determined by the cluster's golden set.

In some embodiments in which N=8 and n=4, each code word of the $2^N$ space is a 10-bit TMDS-encoded word, and the $2^n$ space is a subset of the full set of 10-bit TMDS-encoded words. Each transmitted 10-bit TMDS code word is decoded in accordance with the TMDS decoding algorithm (or a modified version thereof) to generate an 8-bit code word. In these and other embodiments of the invention, the transmission of golden words (and any decoding thereof) can result in error or can be error free.

For each specific golden word, certain types of transmission errors can be expected when the channel has intersymbol interference or other degradations. Thus, for each golden word (i.e., for each N-bit member of the $2^n$ space), the cluster containing such golden word preferably includes all the N-bit members of the $2^n$ space likely to result from occurrence of such a transmission error during transmission of the golden word. However, since the clusters are disjoint, an N-bit word included in one cluster is omitted from all the other clusters.

Each embodiment of the invention employs at least one (and typically more than one) cluster that contains at least one code in addition to each golden word of a golden set. Some embodiments of the invention employ at least one cluster that contains at least one code in addition to each golden word of a golden set, and also at least one other cluster that contains no code other than each golden word of a golden set. Since all the clusters (e.g., $S_a$, $S_b$, etc. of FIG. 7) are mutually disjoint, then regardless of whether or not an error occurs during transmission (or transmission and decoding), if a cluster contains a received N-bit code, the received code is mapped back to the correct source word.

In a class of implementations of FIG. 7, the full set of code words (the "$2^N$ space") is the full set of 10-bit TMDS code words, and the "$2^n$ space" consists of those TMDS code words that are indicative of a predetermined set of 16 different 8-bit source data words. Thus, each cluster includes a golden set of the TMDS code words including golden words indicative of one of the 16 different source data words. Typically, 4-bit words of raw source data are preliminarily encoded as the 16 different 8-bit source data words, and each resulting 8-bit source data word is then encoded as one of the 10-bit members of the $2^n$ space for transmission. Thus, the robust subset (of the full set of TMDS code words) consists of those 10-bit TMDS code words that (when decoded in accordance with the TMDS decoding algorithm or a modified version thereof) determine the 16 predetermined 8-bit source data words (of the 256 eight-bit source data words determined by the full set of TMDS code words). Each cluster preferably includes not only the golden words of a golden set, but also at least one 10-bit TMDS code word "similar" to one of the golden words in the sense that it is more likely to result from bit errors in transmission of the golden word than are other TMDS code words (e.g., the code word "similar" to the golden word may differ from the golden word only in the value of one of its bits).

The process of selecting the golden sets from the full set of code words is very important. In general, the best choice for the specific golden sets selected from a full set of binary code words depends on the particular coding implemented by the full set (i.e., the details of which bits of each code word in the full set are zeroes and which are ones). As noted above, in some preferred embodiments, the code words of the golden sets are selected to be those whose serial patterns (during transmission) have fewer contiguous zeros and ones (e.g., on the average), and thus are less susceptible to ISI during transmission, than do those code words in the full set that are not selected (e.g., the average number of contiguous zeros and ones, per code word, of the golden words is less than the average number of contiguous zeros and ones, per code word, of the code words in the full set that are not selected as golden words).

In other preferred embodiments, the golden words are selected to be those satisfying the criterion that the Hamming distance between any golden word in one cluster and any golden word in any other cluster exceeds a threshold, or the criterion that the Hamming distance between golden words in different clusters is maximized (in some sense) to the extent practical (e.g., the criterion that an average Hamming distance between golden words in different clusters is maximized) subject to the constraint that the clusters are mutually disjoint. This helps to increase the number of "errored codes" (codes other than golden codes of one golden set) that can be included in each cluster, while keeping the constraint that the clusters are mutually disjoint.

To implement the invention, the receiver (e.g., receiver 2' of FIG. 2) is preferably configured to include a predetermined table that outputs one value (e.g., a source data word) determined by each cluster in response to each input indicative of an element of the cluster (e.g., in response to each of four received code words, where the cluster consists of one golden word and three code words similar to the golden word). The table implements a mapping of each received code word in each cluster to the source word determined by the cluster's golden set, or of each received code word in each cluster to a golden word of the cluster's golden set (which is then mapped by conventional hardware or software in (or external to) the receiver to a source word determined by the cluster's golden set), or of a decoded version of each received code word in each cluster to a source word determined by the cluster's golden set, or of a decoded version of each received code word in each cluster to a single decoded code word (which is then mapped by conventional hardware or software in, or external to, the receiver to a source word determined by the cluster's golden set).

For example, receiver 2' of FIG. 2 includes "code word recovery, mapping, and decoding" circuitry 20, which implements such a table. Circuitry 20 is configured to recover 10-bit TMDS code words from the data received on each of Channel 0, Channel 1, and Channel 2, to map each recovered word in one of the clusters to a golden word of the cluster (using the table), to decode each golden word to generate an 8-bit decoded value (one of the seventeen 8-bit words in the left column of FIG. 4). The 8-bit decoded values are indicative of source words, and circuitry 20 optionally generates a 4-bit raw source data word in response to each 8-bit word that is indicative of one of the words AD-0-AD15 in FIG. 4).

The clusters (and thus the inputs to the above-mentioned table in the receiver) can be a partition of the full set of code words (e.g., the $2^N$ space of FIG. 7), so that the union of the clusters covers the whole space of code words (e.g., the entire $2^N$ space of FIG. 7) and the clusters are mutually disjoint. However, when the probability that one of the code words in the full set will be received in response to transmission of one golden word is very small or negligible, then such code word can be excluded from all of the clusters (and dropped from the table). In the latter case, the union of the clusters does not cover the whole space of code words (e.g., the entire $2^N$ space of FIG. 7).

For convenience, in the claims, we use the expression "to map each code word of a cluster to the input data (or source data) value determined by the cluster's preferred word set (or golden set)," or variations on this expression, to denote the mapping of each code word of a cluster directly to the source data (input data) value determined by the cluster's preferred word set (golden set), or the mapping of each code word of a cluster to a golden word (or preferred word) of the cluster's golden set (or preferred word set) optionally followed by conventional mapping of the golden word (or preferred word) to the source data (input data) value determined by the cluster's golden set (or preferred word set), or the mapping of a decoded version of each code word of a cluster to the source data (input data) value determined by the cluster's golden set (or preferred word set), or the mapping of a decoded version of each code word of a cluster to a single decoded code word optionally followed by conventional mapping of the decoded code word to a source data (input data) value determined by the cluster's golden set (or preferred word set).

Since a large number of possible errors can occur, it is possible that predicted errors that are likely to affect transmission of two different golden words (of two different golden sets) will produce the same received code. This could undesirably cause an overlap in the clusters including the two golden sets, unless one of the clusters is predetermined to exclude the received code. To avoid such overlap between clusters, the received code that is less likely to occur should be excluded from the relevant cluster. For example, if a first cluster includes a first golden word, a second cluster includes a second golden word, a received code word (that is not a golden word) is expected (with probability P1) to result from transmission of the first golden word, and the same received code word is expected (with probability P2, where P2 is less than P1) to result from transmission of the second golden word, then the first cluster should include the received code word, but the received code word should not be included in the second cluster.

As noted, some implementations of the inventive receiver are configured to perform a two-stage mapping of received versions of the golden words to source data values: a first stage in which each received code word in a cluster is mapped to a golden word of the cluster's golden set; and a second stage in which the golden words determined during the first stage is mapped to the source word determined by the cluster's golden set. In some such implementations, an additional block of error correction code is transmitted with each set of golden words, and the receiver is configured to perform the first stage of mapping before performing error correction using the error correction code (to correct error-containing received code words that are not members of any of the clusters, to replace them with golden words to the extent possible). In the latter implementations, the inventive golden words and clusters are preferably chosen so as to implement mappings that exploit the degree of freedom provided by the performance of error correction. For example, the golden words can be selected to satisfy the criteria that the Hamming distance between any two golden words in different clusters is minimized to the extent practical (or otherwise not maximized), and that the clusters are mutually disjoint. With clusters including such golden words, the number of erroneous bits detected by the error correction circuitry in the receiver can be minimized and hence, the overhead of the error correction code can be minimized.

For example, an implementation of receiver 2' of FIG. 2 includes error correction circuitry 22 coupled to an output of "code word recovery, mapping, and decoding" circuitry 20. Circuitry 20 is configured to perform a first stage of mapping to generate golden words in response to recovered code words that are members of the inventive clusters, and to assert (to circuitry 22) the error correction code and any 10-bit code words received over the link that are not members of any cluster. Circuitry 22 performs error correction using the error correction code to correct error-containing received code words that are not members of any of the clusters, thereby replacing such error-containing code words with golden words to the extent possible. Circuitry 20 is optionally also configured to decode the golden words that it receives or generates. The golden words generated by circuitry 22 can be asserted to circuitry 20 for decoding, or can be decoded by other decoding circuitry within receiver 2'. In variations on the described implementation of receiver 2', circuitry 22 is omitted.

With reference to FIG. 4, we next describe a specific example of a set of seventeen golden words and a set of code word clusters (each including one of the golden words) employed in a class of preferred embodiments of the invention. In FIG. 4, the third column (from the left) shows the seventeen golden words, which have been described above. Sixteen of the golden words are used to encode sixteen different 8-bit source data words (each 8-bit source data word being indicative of four bits of raw source data), and the other golden word (the word "1100110010" in the first row) is used only as a guard band word. Each of the golden words is a 10-bit TMDS encoded word. The fourth column (from the left) shows some possible error cases for each 10-bit golden word, the fifth column shows the 8-bit word resulting from decoding of the corresponding 10-bit word in the fourth column in accordance with the conventional TMDS decoding algorithm, and the sixth column simply shows the hexadecimal representations of the corresponding elements in the fifth column. The seventh column (from the left) includes an indication as to whether each corresponding word in the fourth column is or is not a member of the cluster containing the corresponding golden word in the third column. Specifically, the term "IGNORE" in the seventh column indicates that the corresponding word in the fourth column is not a member of the cluster that contains the corresponding golden word in the third column.

There are seventeen clusters (separated by the horizontal bars in FIG. 4): a first cluster including the golden word "1100110010" and the code words "1110110010" and "1100010010" (all mapped to the "pre-data" auxiliary guard band word "01010101"); a second cluster (for encoding the source word AD0) including the golden word "0011100101" and the code words "1011100101," "0001100101," "0011110101," and "0011100001" (all mapped to the source word AD0); a third cluster (for encoding the source word AD1) including the golden word "0110001101" and the code words "0111001101" and "0110000101" (all mapped to the source word AD1); and the fourteen other indicated clusters (each including a different one of the fourteen other golden words, and consisting of words mapped to a different one of the source words AD2-AD15).

When the receiver recovers a code word (in the fourth column of FIG. 4) in one of the indicated clusters (there will be no "IGNORE" symbol in the seventh column corresponding to such recovered code word), the receiver will map the recovered code word to the source word (in the first column of FIG. 4) determined by the cluster's golden word (which is equivalent to mapping the recovered code word to the cluster's golden word in the third column).

Those code words in the fourth column marked with the term "IGNORE" in the seventh column are not members of the cluster that contains the corresponding golden word. For example, the code word "1100111010" in the third row of FIG. 4 is not a member of the first cluster (containing golden word "1100110010") because this code word is a member of the cluster that contains golden word "1000111010" and the clusters should be disjoint. Although the receiver would recover code word "1100111010" as a result of a single bit error (having relatively high probability) in transmission of golden word "1100110010" (in the first row of FIG. 4), and also as a result of a single bit error (also having relatively high probability) in transmission of golden word "1000111010" (in the 45$^{th}$ row of FIG. 4), the receiver would map the received word to 8-bit source word "AD10" (which is equivalent to mapping the received word to the golden word "1000111010") rather than mapping to the source word ("01010101") determined by golden word "1100110010."

For another example, when the transmitter transmits the golden word "1100110010" (in the first row of FIG. 4), the receiver would recover the code word "1100110010" if the transmission is error-free (which has very high probability). The receiver would decode this recovered word in accordance with the conventional TMDS-decoding algorithm to determine decoded 8-bit word "01010101" and map the decoded 8-bit word to the source word "01010101" (which is the pre-data auxiliary guard band word). The receiver would recover the word "0011001111" (in the 52$^{nd}$ row of FIG. 4) as a result of a single bit error (having relatively lower probability) in transmission of golden word "0011001101," and the receiver would decode this recovered word in accordance with the conventional TMDS-decoding algorithm (inverting its eight least-significant bits as a result of the value of its DC balancing bit) to determine the same decoded 8-bit word ("01010101"). The receiver would map this received word to the source word "01010101" (which is equivalent to mapping the received word to the golden word "1000111010").

With reference to the inventive guard band words described above, each guard band word can be a golden word (as in the FIG. 4 example) in which case there can be a cluster for each guard band word, each such cluster containing two or more code words (including a guard band word). Alternatively, the guard words are not golden words but they are reliably distinguishable from the golden words.

In each embodiment of the invention that employs at least one guard band word, each guard band word should have a bit pattern which allows the receiver to more reliably identify the relevant transition (indicated by the guard band word or words) between encoded control (or sync) word transmission and encoded data transmission. Thus, an additional factor in the selection of the inventive golden set is that the golden set should includes appropriate guard band words (i.e., the guard band words are golden words), or each golden word of the golden set should be reliably distinguishable from each guard band word to be employed. For example, the set of 17 golden words shown in FIG. 4 includes a special auxiliary guard band word (having bit pattern "1100110010," and shown in the third column of the first row of FIG. 4) that is used to identify the start of an auxiliary data burst. As shown in FIG. 5, two repetitions of this "pre-data" auxiliary guard band word are preferably transmitted at the start of each burst of encoded auxiliary data (i.e., just after each auxiliary preamble) in each of channels CH2 and CH1. Since the last bit of each specific encoded control word transmitted in channels CH2 and CH1 (during the auxiliary preamble) is "0" as explained above, the first transmitted bit of the code word chosen as the pre-data auxiliary guard band word is "1" to increase the reliability with which the receiver can identify the start of a transmitted burst of auxiliary data.

The set of 17 golden words shown in FIG. 4 also includes a word (the golden word "0011001101" that corresponds to input word AD11) that is used to identify the end of an auxiliary data burst, and is also used as a video guard band word. As shown in FIG. 5, two repetitions of this "post-data" auxiliary guard band word are preferably transmitted at the end of each burst of encoded auxiliary data (i.e., just before each video preamble) in each of channels CH2 and CH1.

The pre-data auxiliary guard band word need not be repeated (transmitted twice) at the start of each auxiliary data burst, and the post-data auxiliary guard band word need not be repeated at the end of each auxiliary data burst. In the preferred embodiment (indicated by FIG. 5), each is repeated in order to allow the receiver more easily to recognize and correct for data shift errors between channels that can occur during transmission and recovery of the data (e.g., error in the trace length of the received data on channel CH1 relative to that of the data received on channel CH2). In other embodiments of the invention, an auxiliary guard band word is repeated more than twice (or is transmitted only once) at the start of each auxiliary data burst and/or more than twice (or is transmitted only once) at the end of each auxiliary data burst.

With reference to FIG. 4, the golden word "0011001101" (that corresponds to input word AD11) is used as a video guard band word to identify the start of a video data burst, in addition to being used as a code word for encoding the four-bit quantity of auxiliary data indicated by input word AD11, and as a post-data auxiliary guard band word. As shown in FIG. 6, two repetitions of this video guard band word are preferably transmitted at the start of each burst of encoded video data (i.e., just after each video preamble). Since the last two bits of the encoded control or sync word transmitted in each of channels CH1 and CH2 (at the end of the video preamble) are likely to be "11" as explained above, the first two transmitted bits of the video guard band word are chosen to be "00" to increase the reliability with which the receiver can identify the start of a transmitted burst of video data.

The video guard band word need not be repeated (transmitted twice) at the start of each video data burst. In the preferred embodiment shown in FIG. 6, it is repeated in order to ensure transmission (on each of channels CH0, CH1, and CH2) of code words indicative of an even number of pixels during the burst. In other embodiments, a video guard band word is repeated more than twice (or is transmitted only once) at the start of each video data burst.

In some embodiments of the invention, two (or more than two) streams of video data are transmitted (over one, two, or more than two channels). For example, two or more streams of video data can be transmitted in time-multiplexed fashion over each of one or more of Channels 0, 1, and 2 of FIG. 2. If bursts of different streams of video data are sequentially transmitted over one channel, different video guard band words can be transmitted at the start (and/or the end) of each burst, with each different stream being identified by a different video guard band word. Similarly, two (or more than two) streams of auxiliary data can be transmitted over one, two, or more than two channels). If bursts of different streams of auxiliary data are sequentially transmitted over one channel, different auxiliary guard band words can be transmitted at the start (and/or the end) of each burst, with each different stream being identified by a different guard band word.

Where encoded data are transmitted serially over multiple independent channels, DE shifts in individual channels can be corrected independently (in accordance with the invention) by using guard band words in each channel. Since there can be misalignment between the DE transitions indicated by the bits transmitted over multiple channels of a TMDS link (or TMDS-like link or other serial link) by one pixel clock cycle (or more than one pixel clock cycle) in either direction (due to ISI or other noise sources on the link), a set of identical guard band words (each a member of the set of inventive code words) is preferably transmitted in accordance with the invention at the start and/or end of each burst of data encoded using the inventive code words that is transmitted over each channel (e.g., at the end of each auxiliary preamble of each channel, and/or at the start of the video preamble of each channel, and/or at the end of the video preamble of each channel). This can improve the channel-to-channel alignment and data integrity. The need to have available the appropriate number of guard band words is a factor in the selection of the inventive set of code words.

The purpose of repeating the transmission of a guard band word (either at the transition between an expected bit pattern and a burst of data encoded in accordance with the invention following such pattern, or at the transition between a burst of data encoded in accordance with the invention and an expected bit pattern that follows such data) is to prevent two types of misidentification of transitions: identifying the transition too early and identifying the transition too late. By transmitting a repeating sequence of N guard band words, the invention prevents such pixel shift errors up to N pixels in either direction. For example, if a sequence of N post-data guard band words is appended to an encoded data burst, the invention ensures that when there is an N pixel shift to the left, the last data value is not lost (only the post-data guard band word is lost). Generally, a sequence of only N post-data guard band words is needed for use with a sequence of N pre-data guard band words.

In the preferred embodiment (indicated by FIG. 5), the auxiliary guard band words transmitted at the start and end of each auxiliary data burst on channels CH2 and CH1 are not transmitted at the start and end of each auxiliary data burst on channel CH0. Rather, special encoding is used to determine the first two and last two 10-bit inventive code words transmitted in each auxiliary data burst on channel CH0. Specifically, each of the first two input auxiliary data packets to be encoded and the last two input auxiliary data packets to be encoded comprises two bits (whereas all the other packet comprise four bits as described above). The first 2-bit input auxiliary packet is encoded as one of the words AD0, AD1, AD2, and AD3 in FIG. 4 and the second 2-bit input auxiliary packet is encoded as another one of the words AD0, AD1, AD2, and AD3. Thus, the first two 10-bit words transmitted in the burst are versions of the inventive code word indicative of these two words AD0, AD1, AD2, and AD3 (and are thus indicative of the first four bits of input auxiliary data). Similarly, the second-last 2-bit input auxiliary packet is encoded as one of the words AD0, AD1, AD2, and AD3 in FIG. 4 and the last 2-bit input auxiliary packet is encoded as another one of the words AD0, AD1, AD2, and AD3. The last two 10-bit words transmitted in the burst are versions of the inventive code word indicative of these two words AD0, AD1, AD2, and AD3 (and are thus indicative of the last four bits of input auxiliary data).

More generally, different control or synchronization bits (e.g., the 10-bit control characters indicative of bits CTL0: CTL1 or CTL2:CTL3 in the DVI specification) can produce different errors on video (or auxiliary) data bits that are transmitted just after the control characters, when ISI is present on the serial data transmission channel. This is preferably recognized and used as a factor in selecting the inventive code word set for use in transmitting the video (or auxiliary) data. Alternatively, the control codes sent just before the data (encoded in accordance with the invention) are controlled to reduce the ISI effect.

In other embodiments of the invention, bursts of encoded auxiliary data and bursts of encoded video data are transmitted over a serial link (which need not be a TMDS link), and the auxiliary data are encoded in accordance with the invention using a set of inventive code words. The set of inventive code words includes a "video" guard band word that is transmitted at the start of each encoded video data burst, and an "auxiliary" guard band word that is transmitted at the start of each encoded auxiliary data burst. In some implementations, the video guard band word is also used for a second purpose: to encode auxiliary data. In preferred implementations of such embodiments, the encoded video data are transmitted during active video periods in which a video data enable signal is high (e.g., control signal "DE" satisfies DE=1), and encoded control (or synchronization) signals and encoded auxiliary data are transmitted during blanking intervals (when the video data enable signal is low) between active video periods. A video guard band word is transmitted at the start of each active video period. Each blanking interval comprises an "auxiliary" preamble period (between the falling edge of the video data enable signal and the start of a burst of auxiliary data) in which control (or sync) signals of a specific type are transmitted, at least one auxiliary data period after the auxiliary preamble period (each auxiliary data period comprising an auxiliary guard band word followed by a burst of encoded auxiliary data), and a "video" preamble period between the last auxiliary data period and the next active video period. In general, the purpose of using guard band words in accordance with the invention is to guarantee that the receiver can recognize the transition between the first guard band word transmitted at the start of an encoded data burst and the last bit transmitted before such guard band word, and between the last guard band word transmitted at the end of an encoded data burst and the first bit transmitted after such guard band word.

In a class of embodiments of the invention, a conventional encoding algorithm is used to encode primary data (which can but need not be video data) for transmission in bursts over a serial link, and auxiliary data (e.g., audio data or data of another type that can be transmitted with a lower data rate than the primary data) are encoded in accordance with the invention for transmission in bursts (between bursts of the encoded primary data) over a serial link. The full set of code words used for encoding the primary data has at least one code word for each of $2^N$ different words of the primary data (sometimes referred to as source data words). The inventive subset of such full set has at least one code word for each of not more than $2^M$ different words (where M<N) of the auxiliary data (also referred to sometimes as source data words). The auxiliary data are buffered and packed into M-bit format (i.e., into words each consisting of M bits). Each possible value of the M-bit source data has a preselected code in the $2^M$ word space provided by the inventive code words. The M-bit words of auxiliary data are mapped to inventive code words in the $2^M$ word space which are then transmitted over the link.

In choosing which of the inventive golden words to employ to transmit encoded data (e.g. auxiliary data distinct from video data) in accordance with the invention, it is important to consider that some bits (of multi-bit encoded words) present greater risks of error than other such bits. For example, when using TMDS-encoded golden words to transmit auxiliary data, the DC balancing bits and transition control bits (e.g., bits Q[9] and Q[8]) present greater error risks than do the other bits. Any bit error occurring during processing of the DC balancing and transition control bits can affect other bits of the multi-bit encoded words. Hence a one-bit error in one of the critical bits is translated into a burst error. This effect is preferably considered in selecting the inventive code words from a full set of TMDS-encoded words.

It should be understood that while certain forms of the present invention are illustrated and described herein, the invention is defined by the claims and is not to be limited to the specific embodiments described and shown.

What is claimed is:

1. A communication system, including:
   a receiver;
   a transmitter; and
   a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full set of code words, the full set includes predetermined disjoint clusters of the code words, the input data can be encoded as a conventional sequence of code words of the full set, and the sequence of selected code words is less susceptible to inter-symbol interference during transmission over the link than would be the conventional sequence of code words,
   wherein the robust subset consists of preferred words of the full set, the code words of the full set that are not preferred words are non-preferred words, each of the preferred words is indicative of an input data value, each of the clusters includes a preferred word set consisting of at least one of the preferred words, at least one of the clusters also includes at least one of the non-preferred words, each said preferred word set is indicative of a different input data value, and the receiver is configured to map each received code word that is a member of one of the clusters to the input data value determined by the preferred word set of said one of the clusters.

2. The system of claim 1, wherein each said cluster includes at least one of the non-preferred words that is likely to be generated as a result of at least one bit error in transmission, or transmission and decoding, of one of the preferred words of the cluster.

3. The system of claim 1, wherein each said preferred word set consists of one and only one of the preferred words.

4. The system of claim 3, wherein each said cluster also includes at least one of the non-preferred words that is likely to be generated as a result of at least one bit error in transmission, or transmission and decoding, of the cluster's preferred word.

5. The system of claim 1, wherein the link comprises at least one video channel, the transmitter is configured to transmit video data and auxiliary data to the receiver over the video channel, the video data are determined by the full set of code words, and the auxiliary data are determined by the preferred words.

6. The system of claim 1, wherein the preferred words satisfy the criterion that the Hamming distance between any preferred word in any one of the clusters and any preferred word in any other one of the clusters exceeds a threshold.

7. The system of claim 1, wherein the preferred words satisfy the criterion that the Hamming distance between the preferred words in different ones of the clusters is maximized to the extent practical.

8. The system of claim 1, wherein the transmitter is configured to transmit error correction code blocks over the serial link with the sequence of selected code words, and wherein the receiver also includes:
   error correction circuitry configured to perform error correction, using the error correction code blocks, on at least some received code words that are not members of any of the clusters, and wherein the preferred words satisfy the criterion that the Hamming distance between the preferred words in different ones of the clusters is minimized to the extent practical.

9. The system of claim 1, wherein each received code word that is non-preferred word of one of the clusters is an error-containing word, and the receiver is configured to implement error correction by mapping each said error-containing word to the input data value determined by the preferred word set of said one of the clusters.

10. The system of claim 1, wherein the input data are auxiliary data, the transmitter is coupled to receive video data and configured to generate a sequence of video code words by encoding the video data, and the transmitter is configured to transmit to the receiver over the serial link a first burst of the video code words followed by a burst of the selected code words followed by a second burst of the video code words, wherein each of the video code words is a member of the full set of code words and at least one of the video code words is not a member of the robust subset.

11. The system of claim 10, wherein the transmitter is also coupled to receive control bits, configured to generate bursts of encoded control words by encoding the control bits, and configured to transmit to the receiver over the serial link a first burst of the encoded control words between the first burst of the video code words and the burst of the selected code words, and a second burst of the encoded control words between the burst of the selected code words and the second burst of the video code words.

12. The system of claim 11, wherein the selected code words include at least one guard band word, the burst of the selected code words has an initial word, and the initial word is the guard band word.

13. The system of claim 11, wherein the selected code words include at least one guard band word, the burst of the selected code words has an initial set of words, and each word of the initial set of words is one said guard band word.

14. The system of claim 11, wherein the selected code words include at least one guard band word, the burst of the selected code words has a final word, and the final word is the guard band word.

15. The system of claim 11, wherein the selected code words include at least one guard band word, the burst of the selected code words has a final set of words, and each word of the final set of words is one said guard band word.

16. The system of claim 11, wherein the serial link is a transition minimized differential signaling ("TMDS") link, and the selected code words consist of seventeen different, transition-minimized TMDS code words, including at least one transition-minimized TMDS code word used as a guard band word.

17. The system of claim 11, wherein the selected code words include at least two guard band words, including a first guard band word and a second guard band word, the second burst of the video code words has an initial word, the initial word of the second burst of the video code words is the first guard band word, the burst of the selected code words has an initial word, and the initial word of the burst of the selected code words is the second guard band word.

18. The system of claim 17, wherein the serial link is a TMDS link, and the selected code words consist of seventeen different, transition-minimized TMDS code words, including a transition-minimized TMDS code word used only as said second guard band word and another transition-minimized TMDS code word used as said first guard band and also used as one of the selected code words in said burst of the selected code words.

19. The system of claim 1, wherein the input data are auxiliary data, the transmitter is coupled to receive video data and configured to generate a sequence of video code words by encoding the video data, and the transmitter is configured to transmit to the receiver over the serial link a first burst of the video code words followed by at least two bursts of the selected code words followed by a second burst of the video code words, wherein each of the video code words is a member of the full set of code words and at least one of the video code words is not a member of the robust subset.

20. The system of claim 19, wherein the transmitter is also coupled to receive control bits, configured to generate bursts of encoded control words by encoding the control bits, and configured to transmit to the receiver over the serial link a first burst of the encoded control words between the first burst of the video code words and the bursts of the selected code words, and a second burst of the encoded control words between the bursts of the selected code words and the second burst of the video code words.

21. The system of claim 20, wherein the selected code words include at least one guard band word, a first one of the bursts of the selected code words has an initial word, and the initial word is the guard band word.

22. The system of claim 20, wherein the selected code words include at least one guard band word, a first one of the bursts of the selected code words has an initial set of words, and each word of the initial set of words is one said guard band word.

23. The system of claim 1, wherein the serial link is a transition minimized differential signaling ("TMDS") link.

24. The system of claim 23, wherein the selected code words consist of seventeen different TMDS code words, including at least one TMDS code word used only as a guard band word.

25. The system of claim 23, wherein the selected code words consist of seventeen different, transition-minimized TMDS code words, including at least one transition-minimized TMDS code word used only as a guard band word.

26. The system of claim 1, wherein each of the selected code words is an L-bit binary word, and each of at least a subset of the selected code words is indicative of an M-bit word of the input data, where M is less than L.

27. The system of claim 26, wherein L=10, and M=4.

28. The system of claim 26, wherein the transmitter is coupled to receive source words of the input data, where each of the source words comprises N bits, N is less than L, and N is greater than M, and the transmitter is configured to pack the source words into M-bit words of the input data and to encode each of the M-bit words of the input data as one of the selected code words.

29. The system of claim 1, wherein each of the selected code words is an L-bit binary word, a first subset of the selected code words is indicative of an M-bit word of the input data, where M is less than L, and a second subset of the selected code words is indicative of an N-bit word of the input data, where N is less than M.

30. The system of claim 29, wherein L=10, M=4, and N=2.

31. The system of claim 1, wherein the full set of code words is a set of 10-bit, transition-minimized, TMDS code words.

32. The system of claim 1, wherein each of the selected code words is indicative of a sequence of L binary bits, and the preferred words have fewer contiguous zero bits and contiguous one bits per code word on the average than do the non-preferred words of the full set.

33. The system of claim 1, wherein each of the selected code words is indicative of a different sequence of binary bits, the transmitter is configured to transmit the sequence of selected code words to the receiver over the serial link as a sequence of rising and falling voltage transitions, and the selected code words have bit patterns that implement DC balancing by limiting voltage drift of the serial link during transmission of said sequence of selected code words to a predetermined amount.

34. A receiver for receiving transmitted code words resulting from transmission, over a serial link, of a sequence of selected code words indicative of input data, wherein each of the selected code words is a member of a robust subset of a full set of code words, the full set includes predetermined disjoint clusters of the code words, the input data can be encoded as a conventional sequence of code words of the full set, the sequence of selected code words is less susceptible to inter-symbol interference during transmission over the link than would be the conventional sequence of code words, the robust subset consists of preferred words of the full set, the code words of the full set that are not preferred words are non-preferred words, each of the preferred words is indicative of an input data value, each of the clusters includes a preferred word set consisting of at least one of the preferred words, at least one of the clusters also includes at least one of the non-preferred words, and each said preferred word set is indicative of a different input data value, said receiver including:
 at least one input configured to be coupled to the link for receiving the transmitted code words; and
 circuitry, coupled to the input and configured to map each of the transmitted code words that is a member of one of the clusters to the input data value determined by the preferred word set of said one of the clusters.

35. The receiver of claim 34, wherein the preferred words satisfy the criterion that the Hamming distance between any preferred word in any one of the clusters and any preferred word in any other one of the clusters exceeds a threshold.

36. The receiver of claim 34, wherein the preferred words satisfy the criterion that the Hamming distance between the preferred words in different ones of the clusters is maximized to the extent practical.

37. The receiver of claim 34, wherein error correction code blocks are transmitted with the transmitted code words, and wherein the receiver also includes:
 error correction circuitry configured to perform error correction, using the error correction code blocks, on at least some of the transmitted code words that are not members of any of the clusters, and wherein the preferred words satisfy the criterion that the Hamming distance between the preferred words in different ones of the clusters is minimized to the extent practical.

38. The receiver of claim 34, wherein the serial link is a transition minimized differential signaling ("TMDS") link, and the transmitted code words are 10-bit TMDS code words.

39. The receiver of claim 34, wherein the serial link is a TMDS link, and the preferred words consist of seventeen different TMDS code words, including at least one TMDS code word used only as a guard band word.

40. The receiver of claim 39, wherein the preferred words consist of seventeen different, transition-minimized TMDS code words, including at least one transition-minimized TMDS code word used only as the guard band word.

41. The receiver of claim 34, wherein each of the selected code words is an L-bit binary word.

42. The receiver of claim 34, wherein each of the selected code words is an L-bit binary word, and each of at least a subset of the selected code words is indicative of an M-bit word of the input data, where M is less than L.

43. The receiver of claim 42, wherein L=10, and M=4.

44. The receiver of claim 34, wherein each of the selected code words is an L-bit binary word, a first subset of the selected code words is indicative of an M-bit word of the input data, where M is less than L, and a second subset of the selected code words is indicative of an N-bit word of the input data, where N is less than M.

45. The receiver of claim 34, wherein L=10, M=4, and N=2.

46. The receiver of claim 34, wherein each of the selected code words is indicative of a sequence of L binary bits, and the preferred words have fewer contiguous zero bits and contiguous one bits per code word on the average than do the non-preferred words of the full set.

47. A method for transmitting encoded data over a serial link, said method including the steps of:
 (a) transmitting a sequence of selected code words over the link, wherein the sequence of selected code words is indicative of words of input data capable of being encoded as a conventional sequence of code words of a full set of code words, each of the selected code words is a member of a robust subset of the full set, said full set includes predetermined disjoint clusters of the code words, the sequence of selected code words is less susceptible to inter-symbol interference during transmission over the link than would be the conventional sequence of code words, the robust subset consists of preferred words of the full set, the code words of the full set that are not preferred words are non-preferred words, each of the preferred words is indicative of an input data value, each of the clusters includes a preferred word set consisting of at least one of the preferred words, at least one of the clusters also includes at least one of the non-preferred words, and each said preferred word set is indicative of a different input data value;
 (b) receiving transmitted code words resulting from transmission of the sequence of selected code words over the link; and
 (c) mapping each of the transmitted code words that is a member of one of the clusters to the input data value determined by the preferred word set of said one of the clusters.

48. The method of claim 47, wherein each said cluster includes at least one of the non-preferred words that is likely to be generated as a result of at least one bit error in transmission, or transmission and decoding, of one of the preferred words of the cluster.

49. The method of claim 47, wherein each said preferred word set consists of one and only one of the preferred words.

50. The method of claim 49, wherein each said cluster also includes at least one of the non-preferred words that is likely to be generated as a result of at least one bit error in transmission, or transmission and decoding, of the cluster's preferred word.

51. The method of claim 47, wherein the preferred words satisfy the criterion that the Hamming distance between any preferred word in any one of the clusters and any preferred word in any other one of the clusters exceeds a threshold.

52. The method of claim 47, wherein the preferred words satisfy the criterion that the Hamming distance between the preferred words in different ones of the clusters is maximized to the extent practical.

53. The method of claim 47, also including the steps of:
transmitting error correction code blocks over the link with the sequence of selected code words; and
performing error correction, using the error correction code blocks, on at least some of the transmitted code words that are not members of any of the clusters, and wherein the preferred words satisfy the criterion that the Hamming distance between the preferred words in different ones of the clusters is minimized to the extent practical.

54. The method of claim 47, wherein each one of the transmitted code words that is a non-preferred word of one of the clusters is an error-containing word, and wherein step (c) implements error correction by mapping each said error-containing word to the input data value determined by the preferred word set of said one of the clusters.

55. The method of claim 47, wherein the input data are auxiliary data, and wherein step (a) includes the step of:
transmitting over the link a first burst of video code words indicative of video data, followed by a burst of the selected code words, followed by a second burst of video code words indicative of video data, wherein each of the video code words is a member of the full set of code words and at least one of the video code words is not a member of the robust subset.

56. The method of claim 55, wherein step (a) also including the step of:
transmitting over the link a first burst of encoded control words between the first burst of the video code words and the burst of the selected code words, and a second burst of encoded control words between the burst of the selected code words and the second burst of the video code words.

57. The method of claim 56, wherein the selected code words include at least one guard band word, the burst of the selected code words has an initial word, and the initial word is the guard band word.

58. The method of claim 56, wherein the selected code words include at least one guard band word, the burst of the selected code words has an initial set of words, and each word of the initial set of words is one said guard band word.

59. The method of claim 56, wherein the selected code words include at least one guard band word, the burst of the selected code words has a final word, and the final word is the guard band word.

60. The method of claim 56, wherein the selected code words include at least one guard band word, the burst of the selected code words has a final set of words, and each word of the final set of words is one said guard band word.

61. The method of claim 56, wherein the selected code words consist of seventeen different, transition-minimized TMDS code words, including at least one transition-minimized TMDS code word used as a guard band word.

62. The method of claim 56, wherein the selected code words include at least two guard band words, including a first guard band word and a second guard band word, the second burst of the video code words has an initial word, the initial word of the second burst of the video code words is the first guard band word, the burst of the selected code words has an initial word, and the initial word of the burst of the selected code words is the second guard band word.

63. The method of claim 62, wherein the selected code words consist of seventeen different, transition-minimized TMDS code words, including one transition-minimized TMDS code word used only as said second guard band word and another transition-minimized TMDS code word used as said first guard band and also used as one of the selected code words in said burst of the selected code words.

64. The method of claim 47, wherein the selected code words consist of seventeen different TMDS code words, including at least one TMDS code word used only as a guard band word.

65. The method of claim 47, wherein the selected code words consist of seventeen different, transition-minimized TMDS code words, including one transition-minimized TMDS code word used only as a guard band word.

66. The method of claim 47, wherein each of the selected code words is an L-bit binary word.

67. The method of claim 47, wherein each of the selected code words is an L-bit binary word, and each of at least a subset of the selected code words is indicative of an M-bit word of the input data, where M is less than L.

68. The method of claim 67, wherein L=10, and M=4.

69. The method of claim 67, also including the steps of:
providing source words of the input data, where each of the source words comprises N bits, N is less than L, and N is greater than M; and
packing the source words into M-bit words of the input data and encoding each of the M-bit words of the input data as one of the selected code words.

70. The method of claim 47, wherein each of the selected code words is an L-bit binary word, a first subset of the selected code words is indicative of an M-bit word of the input data, where M is less than L, and a second subset of the selected code words is indicative of an N-bit word of the input data, where N is less than M.

71. The method of claim 70, wherein L=10, M=4, and N=2.

72. The method of claim 47, wherein the full set of code words is a set of 10-bit, transition-minimized, TMDS code words.

73. The method of claim 47, wherein each of the selected code words is indicative of a sequence of L binary bits, and the preferred words have fewer contiguous zero bits and contiguous one bits per code word on the average than do the non-preferred words of the full set.

74. The method of claim 54, wherein each of the selected code words is indicative of a different sequence of binary bits, and wherein step (a) includes the step of:
transmitting the sequence of selected code words over the serial link as a sequence of rising and falling voltage transitions, wherein the selected code words have bit patterns that implement DC balancing by limiting voltage drift of the serial link during transmission of said sequence of selected code words to a predetermined amount.

75. The method of claim 47, wherein the input data are auxiliary data, and wherein step (a) includes the step of:
transmitting over the link a first burst of video code words indicative of video data, followed by at least two bursts of the selected code words, followed by a second burst of video code words indicative of video data, wherein each of the video code words is a member of the full set of code words and at least one of the video code words is not a member of the robust subset.

* * * * *